US009865976B2

(12) United States Patent
Warren

(10) Patent No.: US 9,865,976 B2
(45) Date of Patent: Jan. 9, 2018

(54) HIGH-DENSITY DATA COMMUNICATIONS CABLE

(71) Applicant: HD Networks, LLC, Palm City, FL (US)

(72) Inventor: David N. Warren, Palm City, FL (US)

(73) Assignee: HD Networks, LLC, Palm City, FL (US)

( * ) Notice: Subject to any disclaimer, the term of this patent is extended or adjusted under 35 U.S.C. 154(b) by 0 days.

(21) Appl. No.: 15/167,462

(22) Filed: May 27, 2016

(65) Prior Publication Data

US 2016/0380397 A1 Dec. 29, 2016

Related U.S. Application Data

(60) Provisional application No. 62/166,878, filed on May 27, 2015.

(51) Int. Cl.
| H01R 3/00 | (2006.01) |
| H01R 24/64 | (2011.01) |
| H01R 31/00 | (2006.01) |
| H04Q 1/00 | (2006.01) |
| H04Q 1/02 | (2006.01) |
| H01R 13/717 | (2006.01) |
| H01R 107/00 | (2006.01) |

(52) U.S. Cl.
CPC .......... H01R 24/64 (2013.01); H01R 31/005 (2013.01); H04Q 1/00 (2013.01); H04Q 1/13 (2013.01); *H01R 13/7175* (2013.01); *H01R 2107/00* (2013.01); *H01R 2201/04* (2013.01)

(58) Field of Classification Search
CPC .. H01R 24/64; H01R 13/7175; H01R 13/516; H01R 13/5829; H01R 2107/00; H01R 25/006; H01R 31/065; H01B 11/1008; H05K 7/1492
USPC ......................................................... 439/490
See application file for complete search history.

(56) References Cited

U.S. PATENT DOCUMENTS

| 4,179,170 | A | * | 12/1979 | Splitt | ................... | H01R 13/514 |
| | | | | | | 337/32 |
| 5,502,391 | A | * | 3/1996 | Sciacero | ............... | H04B 3/487 |
| | | | | | | 324/628 |
| 5,690,511 | A | * | 11/1997 | Melito | ................... | H01R 29/00 |
| | | | | | | 379/438 |
| 6,790,092 | B2 | * | 9/2004 | Parsadayan | .......... | H01R 25/006 |
| | | | | | | 361/118 |
| 6,971,909 | B2 | | 12/2005 | Levesque et al. | | |
| 7,094,109 | B2 | * | 8/2006 | Chou | ................... | H01R 31/065 |
| | | | | | | 439/651 |
| 7,218,828 | B2 | | 5/2007 | Feustel et al. | | |
| 7,488,202 | B2 | * | 2/2009 | Spitaels | ............... | H01R 13/741 |
| | | | | | | 439/532 |
| 8,155,012 | B2 | | 4/2012 | Austermann, III et al. | | |
| 8,157,582 | B2 | | 4/2012 | Frey et al. | | |

(Continued)

*Primary Examiner* — Jean F Duverne
(74) *Attorney, Agent, or Firm* — McHale & Slavin, P.A.

(57) ABSTRACT

Disclosed is a system for operating a network incorporating high-density connections for increased efficiency, network operation and management. The high-density connections are incorporated into the patch panel, network switch, and cables that connects them, as well as into cable analyzers and printed circuit boards (PCBs) which allow for a complete network within a single computer running virtualization software.

4 Claims, 61 Drawing Sheets

(56) References Cited

U.S. PATENT DOCUMENTS

| | | | |
|---|---|---|---|
| 8,882,514 B2* | 11/2014 | Enge | H01R 9/032 |
| | | | 439/676 |
| 8,902,760 B2 | 12/2014 | Austermann, III et al. | |
| 2001/0053627 A1 | 12/2001 | Armistead et al. | |
| 2007/0049127 A1 | 3/2007 | Nordin et al. | |
| 2008/0124971 A1* | 5/2008 | Hoelzel | H01R 25/006 |
| | | | 439/540.1 |
| 2009/0223694 A1* | 9/2009 | Nordin | H01B 11/1008 |
| | | | 174/34 |
| 2010/0197162 A1* | 8/2010 | Straka | H01R 13/516 |
| | | | 439/404 |
| 2012/0094525 A1* | 4/2012 | Maranto | H01R 13/5829 |
| | | | 439/460 |
| 2014/0146492 A1* | 5/2014 | Tang | H05K 7/1492 |
| | | | 361/752 |
| 2015/0002302 A1* | 1/2015 | Garcia Sosa | G06F 1/3215 |
| | | | 340/664 |

* cited by examiner

HIGH-DENSITY DATA COMMUNICATIONS CABLE

PRIORITY CLAIM

In accordance with 37 C.F.R. §1.76, a claim of priority is included in an Application Data Sheet filed concurrently herewith. Accordingly, the present invention claims priority to U.S. Provisional Patent Application No. 62/166,878, entitled "HIGH-DENSITY JACK NETWORK SYSTEM", filed May 27, 2015, the contents of which is incorporated herein by reference.

FIELD OF THE INVENTION

The present invention relates generally to network systems encompassing patch panels, switches, patch cords, servers, cable testers, and printed circuit boards (PCBs), more specifically, to a network system to facilitate cable management functions, enhance space utilization, reduce manpower and time for testing network cables, and minimize reconnection errors and downtime when servicing a network by employing high-density jack connections.

BACKGROUND OF THE INVENTION

Computer networking, recording studios, radio and television networks employ elaborate systems for connecting and routing circuits for monitoring, interconnecting, and testing circuits in a convenient, flexible manner. These networks commonly include patch panels, network switches, network servers, and patch cords to connect them.

Patch panels, also known as patch bays, patch fields, or jack fields, are well-known in the field of data communication systems. Patch panels are used commonly in computer networking, recording studios, radio and television for connecting and routing circuits for monitoring, interconnecting, and testing circuits in a convenient, flexible manner.

A patch panel generally provides a plurality of network ports incorporated into a single structural element that connects incoming and outgoing lines of a local area network (LAN) or other communication, electronic or electrical systems. Patch panels are usually housed within a telecommunications closet or in an alternate location appropriate for patching cables, such as the server room in an office. Typical patch panels are mounted hardware units that include a plurality of port locations, commonly twenty-four or forty-eight, which function like a static switchboard, using cables to interconnect the computers associated with the LAN and/or to connect computers to an outside network, e.g., for connecting to the Internet or other network.

In its most basic sense, a patch panel helps organize the plurality of cables that are to be connected to the LAN, Internet, or other network, by acting as a coupler and creating a fixed point for the cables from remote network devices/stations to come back to and terminate on. Using patch cables connected to the local network switch, network access can be extended to the remote network devices/stations by being plugged into the various ports of the patch panel(s). This increases efficiency of operation, increases security for the network, and management of the system.

A network switch, or switch, is connected to a patch panel port by using a patch cable, or a plurality of patch cables when connecting multiple ports. The network switch is where the signals to and from the remote network devices are connected to the rest of the network.

Patch panels and switches are routinely mounted in what is known as an equipment rack, which permit multiple patch panels and network switches to be organized in a vertical manner. The rack configuration permits wires or cables, e.g., unshielded twisted pair (UTP) cables, coming from remote network stations to be wired to insulation-displacement connectors (IDCs) positioned on the back face of the patch panel, and couples those wires or cables to ports on the front face of the patch panel. This allows the incoming wires or cables to be organized by the ports of a patch panel so that a network administrator can connect specific remote network stations to a network switch using patch cables. Typical patch panels are substantially planar, extending backward on a horizontal plane on one level of the rack. Wires or cables incoming from remote network stations located throughout a building are routed to IDCs at the rear of the patch panel and wired to the patch panel. Patch cables are then routed to the corresponding jack or port on the front face of the patch panel, and then routed to the network switch, thus connecting the remote network station device to the LAN, Internet, or other network.

Because there will need to be at least one patch cord for every remote network device that needs to connect to the LAN, Internet, or other network, the number of patch cables needed for a medium to large office can be in the hundreds, or more. For cable management purposes, elaborate vertical and horizontal cable management trays are often used. Horizontal wire management is used to keep the front of the rack looking clean. Horizontal wire management trays connect to the rack in the same manner a patch panel or switch is attached. They usually are position in the rack between the patch panels and the switches. Cables are often routed between a network switch and patch panel via a horizontal wire management tray. Some racks will have multiple patch panels and switches and require vertical wire management trays in addition or in place of horizontal management trays. Vertical wire management trays are connected to the sides of a rack. Tracing patch cables from the patch panel to the network switch, however, can be a time consuming and difficult process. Sometimes it becomes necessary to replace network switching equipment when upgrading to stay current with industry trends or when hardware failure occurs. When this takes place all patch cables on the switch need to be removed. In many cases, special port configurations are in place on the switch specific to the remote network device connected to it. This adds an extra level of complexity and time constraint when replacing switches and requires that each patch cable be tagged and labeled so that it can be reconnected to the same port and be provisioned with the same applicable settings. The challenge of tracing patch cables, tagging them and removing them from the switch adds time and decreases efficiency of the process when removing a network switch The challenge of identifying and locating tagged patch cables from the previous step and reconnecting them to a replacement switch can be very time consuming and an opportunity for reconnection errors to occur. Many times network administrators are under a time constraint to get the network back online resulting in patch cables getting quickly re-patched to the switch with no regard for neatness or future manageability of the rack. This results in patch cables being intertwisted together and harder to separate or trace out ultimately causing additional downtime down the road with future switch upgrades or when future hardware failure occurs. Additionally, a planned network outage may be scheduled afterhours where the network administrator has sufficient time to correct the cabling mess and properly re-patch everything in a clean and professional manner.

DESCRIPTION OF THE PRIOR ART

U.S. Pat. No. 6,971,909 discloses an Angled Patch Panel Assembly. The angled patch panel is configured to be mounted to a rack or console, and it facilitates cable management functions and enhances space utilization at and around the rack/patch panel assembly. The assembly includes first and second patch panel elements that are angularly oriented with respect to each other. The transition from the first element to the second patch panel element being generally achieved in an apex region. The angled patch panel also includes flange members that extend from the first and second patch panel elements. Each of the flange members defines a mounting face and an extension arm that is intermediate to the mounting face and the patch panel element. The extension arm being dimensioned to facilitate at least partial recessing of the angled patch panel relative to the rack/console when the angled patch panel is mounted thereto.

U.S. Pat. No. 7,218,828 discloses an Optical Fiber Power Splitter Module Apparatus which include at least one input port, one or more multi-fiber output ports, and an optical fiber-splitter device coupled therebetween. The optical splitter device has a first end configured as at least one single optical fiber, and a second end configured as one or more multi-fiber groups. The first end of the splitter device is coupled to the input port and the second end of the splitter device is coupled to the output ports. The first end of the splitter device is, e.g., an LC connector. The second end of the splitter device is, e.g., one or more Multi-fiber Push On (MPO) connectors. The optical splitter device is, e.g., a 1×N planar lightwave circuit (PLC) splitter, such as a 1×32 PLC splitter with an LC input connector and four 8-fiber MPO output connectors.

U.S. Pat. No. 8,155,012 discloses a System and Method for Adapting a Piece of Terminal Equipment. In accordance with the teachings of that invention, a communicating system is provided for generating and monitoring data over pre-existing conductors between associated pieces of networked computer equipment. The system includes a communication device attached to the electronic equipment that transmits information to a central module by impressing a low frequency signal on the pre-existing data lines of the remotely located equipment. A receiver in the central module monitors the low frequency data on the data lines to determine the transmitted information of the electronic equipment. The communication device may also be powered by a low current power signal from the central module. The power signal to the communication device may also be fluctuated to provide useful information, such as status information, to the communication device. Relocation of the electronic equipment with attached communication device to another location on the network is detected immediately and may be used to update a database. The invention is particularly adapted to be used with an existing Ethernet communications link or equivalent.

U.S. Pat. No. 8,157,582 discloses a Telecommunications Patch Panel, including a patch panel frame having a front face, the front face having a series of openings therein for receiving telecommunications plugs. The patch panel frame includes a tray extending rearward from a bottom portion of the front face, and a plurality of multiport bezels are mounted to the patch panel, each having a plurality of cavities, and each cavity aligned with one of the openings in the front face.

U.S. Pat. No. 8,902,760 discloses a Network and System and Optional Tethers. Disclosed is a BaseT Ethernet system having a piece of central network equipment, a piece of BaseT Ethernet terminal equipment, and data signaling pairs of conductors having first and second pairs used to carry BaseT Ethernet communication signals between the piece of central network equipment and the piece of BaseT Ethernet terminal equipment. The first and second pairs physically connect between the piece of BaseT Ethernet terminal equipment and the piece of central network equipment. The piece of central network equipment has at least one DC supply. The piece of BaseT Ethernet terminal equipment has at least one path to draw different magnitudes of current from the DC supply through a loop formed over at least one of the conductors of the first pair and at least one of the conductors of the second pair. The piece of central network equipment to detect at least two different magnitudes of the current flow through the loop.

U.S. Publication No. 2001/0053627 discloses a Single-Port Connection and Circuitry Accepting both Balanced and Unbalanced Data Signals. Disclosed is a circuit and method for connecting data lines to a digital communication system. The circuit allows either a balanced data line or an unbalanced data line to be connected to a single input port with no internal reconfiguration of the system. Connection to a balanced data line isolation transformer is provided at the port. A separate connection to ground is provided at the same port. A user connects the system to a balanced data line using a jack wired for connecting the balanced data line pair across the isolation transformer. A user connects the system to an unbalanced data line using a similar jack; however, the jack in that case is wired to short one transformer connection to the ground connection provided at the port, thereby unbalancing the transformer. In one embodiment, this second jack is part of a patch cable which accepts a coaxial connector on one end, appropriately wired to the shorted jack on the second end.

U.S. Publication No. 2007/0049127 discloses Patch Field Documentation and Revision Systems. Disclosed is a communication device and corresponding patch field system. The device includes a port module, ports, and an appliqué attached to a face of the port module. The appliqué includes a printed circuit board (PCB) with conductive pads. A patch cord connects the device with an intelligent patch panel. The patch cord contains at least one system wire. The patch panel is adapted to measure a resistance associated with each port via the system wire. An open circuit indicates that no patch cord is attached to the port, a resistance within a first range indicates that the patch cord is attached only to the port of the intelligent patch panel, and a resistance within a second range less than the first range indicates that the patch cord connects the intelligent patch panel and the device.

Despite these prior efforts, there remains a need for improved patch panel and switch design which can facilitate cable management functions, minimizing excess cable bundles that must be stuffed into the sides of the rack, and incorporate high density patch cables to enhance space utilization and network administrator efficiency.

SUMMARY OF THE INVENTION

Although wireless technologies can reduce the cable clutter hidden behind many desks, server rooms remain a haven for power cords, patch cords, network cables, and peripheral wiring. Unfortunately, many server rooms are built with little or no regard for cable organization, which can quickly escalate out of control into a cabling nightmare that can take far too long and consume too many resources to organize.

Unmanaged patch cables not only look unsightly, but they become highly susceptible to becoming twisted and crushed, both of which can prevent data signals from being properly transmitted. Tangled network cables can also make troubleshooting and maintenance tasks a nightmare. Because patch cables can be extremely difficult to identify and isolate, searching for the right cable to fix a problem can greatly increase the downtime to fix the problem.

Sometimes these problems arise because getting a server room up and running requires a massive rush; sometimes it's just careless management, sometimes the mess builds over time getting slightly worse with each alteration until it's too late. Sometimes a network installer rushes through a job because they will not be the person managing the server room once set up, and therefore they aren't considering or preparing for the efficiency of later work. Disorganization can also happen during routine adds, moves, and changes, as cables need to be re-routed, or when adding new employees or additional network devices to a network. No matter how it happens, a tangled mess of network cables can become a problem requiring many hours and a lot of patience to go back and fix; during which time the network, and productivity, will be down.

The present invention is directed to a network system incorporating a novel high density jack (HD jack), high density cable (HD cable), and switching equipment and patch panels to accommodate the HD jacks, making them high density switches (HD switches) and high density patch panels (HD patch panels). This system can greatly reduce the complexity and clutter which can occur with a traditional network.

In the present disclosure, UTP cables are still employed to connect remote network stations to the server room, and can still be directly wired into the back of the patch panel. However, instead of the traditional 1-to-1 correspondence between the wired connections at the back of the patch panel and standard 8 pin RJ45 jacks at the front, all of the wired connections at the back are routed to a single HD jack on the front of a 24 port patch panel and to two HD jacks on a 48 port patch panel. Each wire from the UTP cable connects to a pin in a designated group in the HD jack, so that each UTP connection has its own designated path. An HD plug can then connect the HD jack on the patch panel to an HD jack on the network switch.

Two different types of HD cables are disclosed which can be employed, based on the application, to connect devices equipped with HD jacks to other devices equipped with HD jacks or to connect devices equipped with HD jacks to devices equipped with standard 8 pin RJ45 jacks. The first type is an un-split cable that is used to connect two devices equipped with HD jacks. With this type of HD cable, each hole on the HD jack connects via a pin on the HD cable's plug. The HD cable acts as a single cable coupler between two HD jacks. The second type of HD cable splits the cable from the HD jack into constituent cables, so that each pin group from the HD jack corresponds to an individual UTP cable. These individual UTP cables each have an 8 pin male connector end. If the network has an HD patch panel installed but has not yet incorporated an HD switch, these cables can connect the regular input jacks on the front of the non-HD switch to the HD jack on the HD patch panel. In the same manner, if the network has an HD switch but has not yet incorporate an HD patch panel, these split cables can connect the regular input jacks on the front of the non HD patch panel to the HD jack on the HD switch.

Furthermore, if a network has a device equipped with an HD jack and needs to be able to accommodate standard RJ45 connections but wishes to use a non-split HD cable, an HD port converter can be used with. An HD port converter takes an HD jack and breaks it out into 24 or 48 sets of RJ45 jacks as illustrated in FIG. 29 and FIG. 30.

Accordingly, it is an objective of the instant invention to provide a network cable setup which takes less time to install and connect station cables.

It is a further objective of the instant invention to provide a setup which requires fewer patch cables between the patch panel and the switch.

It is yet another objective of the instant invention to provide a setup which can reduce the need for elaborate cable management techniques.

It is a further objective of the instant invention to provide a setup with a cleaner and more organized appearance.

It is yet another objective of the instant invention to provide a setup which is easier to maintain than the network stations of the prior art.

It is a further objective of the instant invention to provide a setup that requires less downtime when swapping out a defective switch or upgrading to a newer switch.

It is yet another objective of the instant invention to provide a setup which eliminates the need to label every patch cable going between switch and patch panel.

It is a further objective of the instant invention to provide a setup which can reduce the use of excess cables taught in the prior art.

It is a still further objective of the instant invention to eliminate the possibility of accidental failure of the 8 PINs in a given switch port or patch panel port that may become damaged or dislocated with the removal of a patch cable. This can occur because the current 8 PINs in a given jack are spring loaded and move in and out when a patch cable is inserted and removed, and thus can come off their track and get damaged, ruining a switch port or patch panel port.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
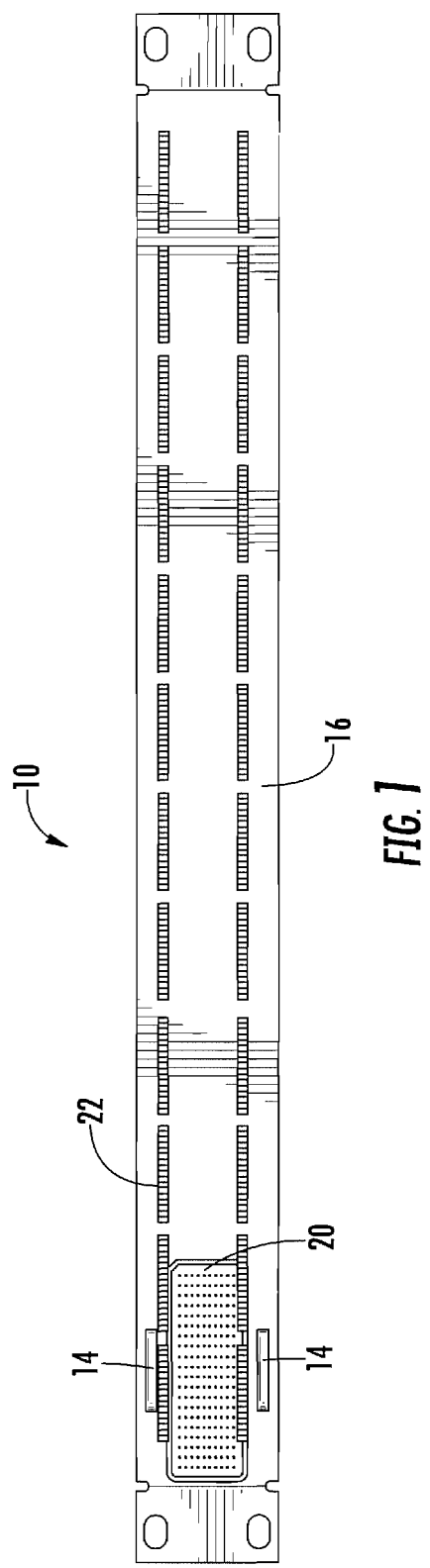
FIG. 1 is a front perspective view of a 24-port HD patch panel.
Figure 2:
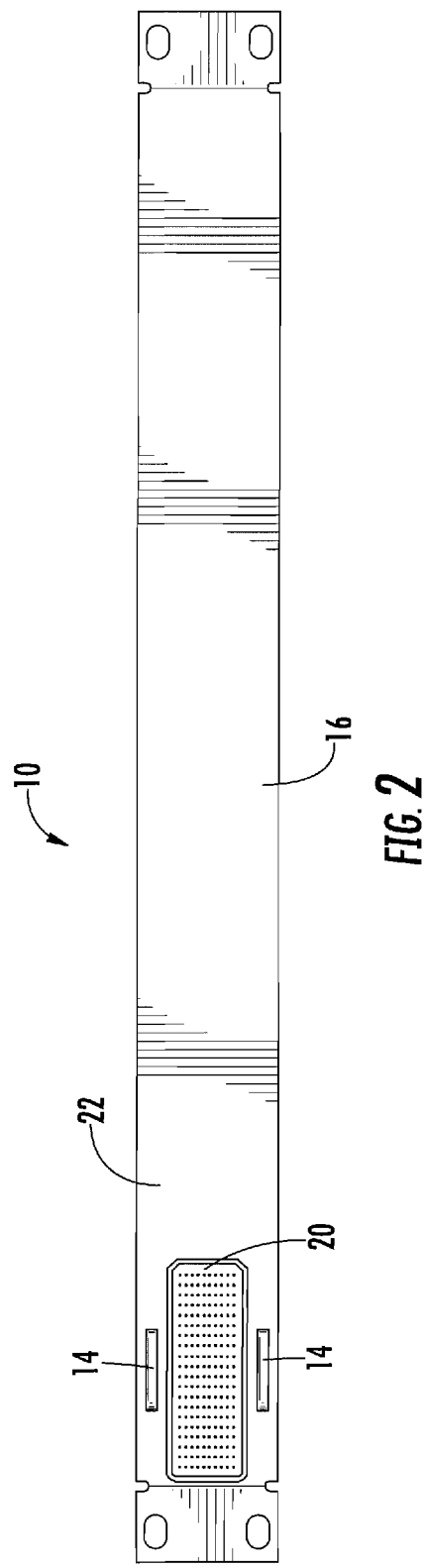
FIG. 2 is a front view of a 192-pin Jack.
Figure 3:
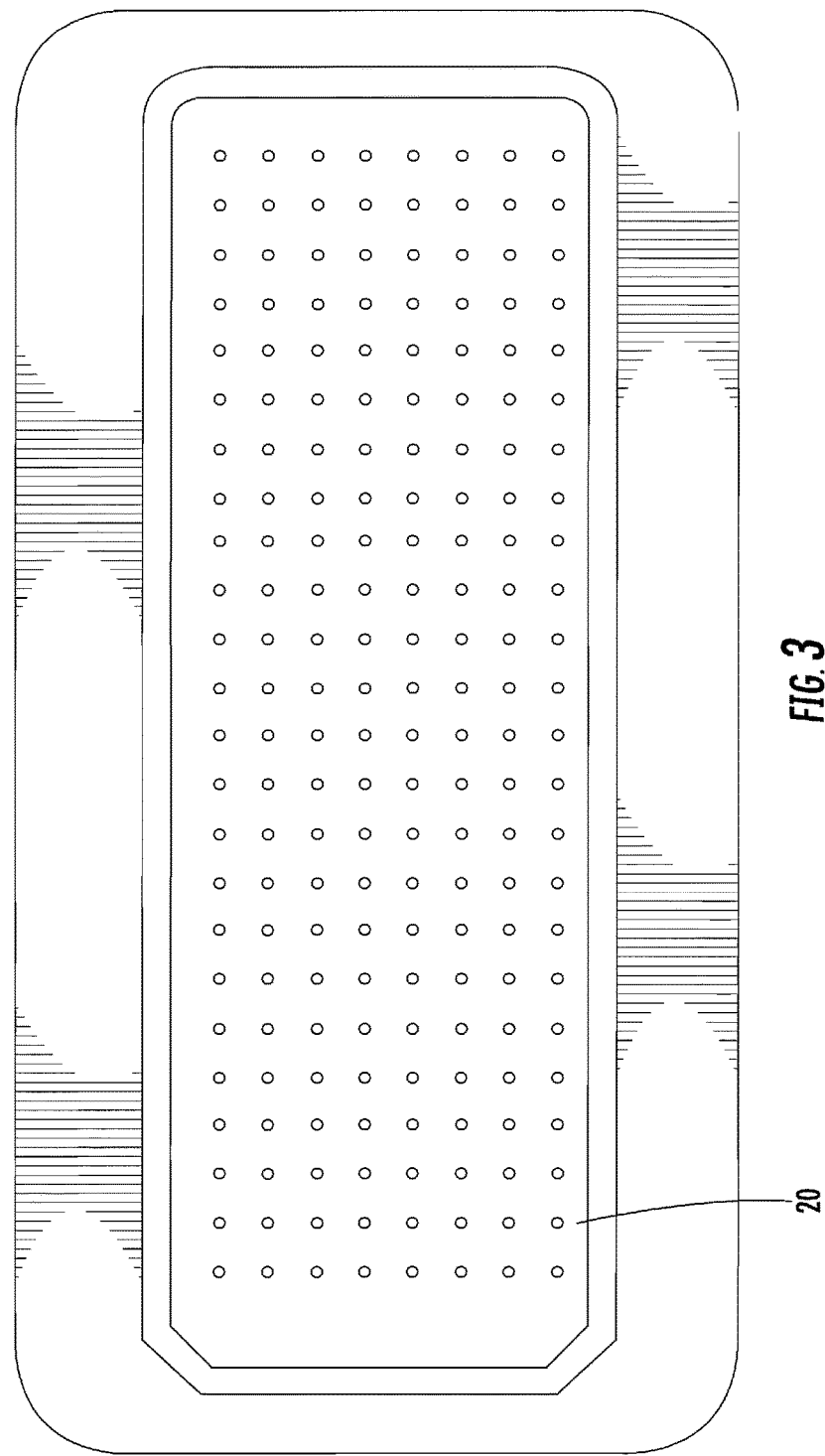
FIG. 3 is a rear view of a 24-port HD patch panel.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring to the figures in general, disclosed is a system for a high-density (HD) network system, including cable connections, to manage and organize a computer or telecommunications network for greater efficiency. The system includes an HD patch panel (10, 30), an HD cable (110), and an HD switch (60, 80, 96, 104, 106) which is used to connect remote computer terminals to a local area network (LAN), Internet, or other network. It also includes an HD cable analyzer (130) and an HD PCB (Printed Circuit Board) (108) enabling a computer to also serve as a network switch.

Figure 4:
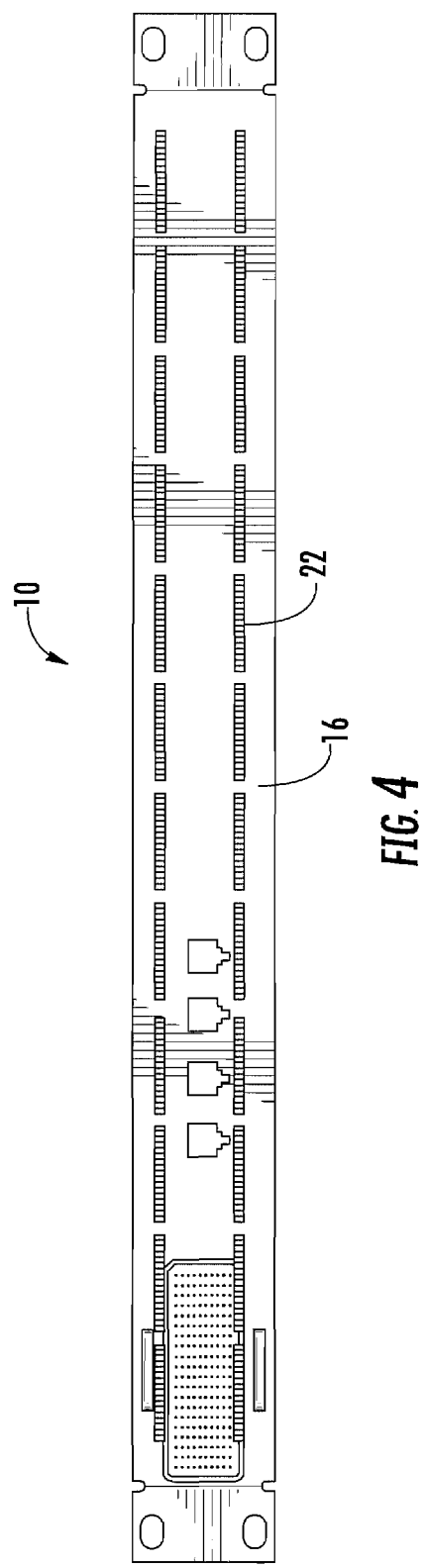
FIG. 4 is a close-up view of the 8 wire configuration on the back of the HD patch panel.

Referring to FIGS. 1-6, disclosed is a 24-port HD patch panel (10). Like a normal patch panel, it includes brackets (12) so that it can attach to a rack. On the front face (16) of the panel (10) there is an HD jack (20), which can connect the remote computer terminals to the network. Additionally, securing brackets (14) can be employed to secure the connection with clips or straps. In FIG. 4 the rear face (18) of the panel can be seen. There are 24 connection groups (22), each configured to connect to a traditional network cable, containing 8 copper wires.

Figure 6:
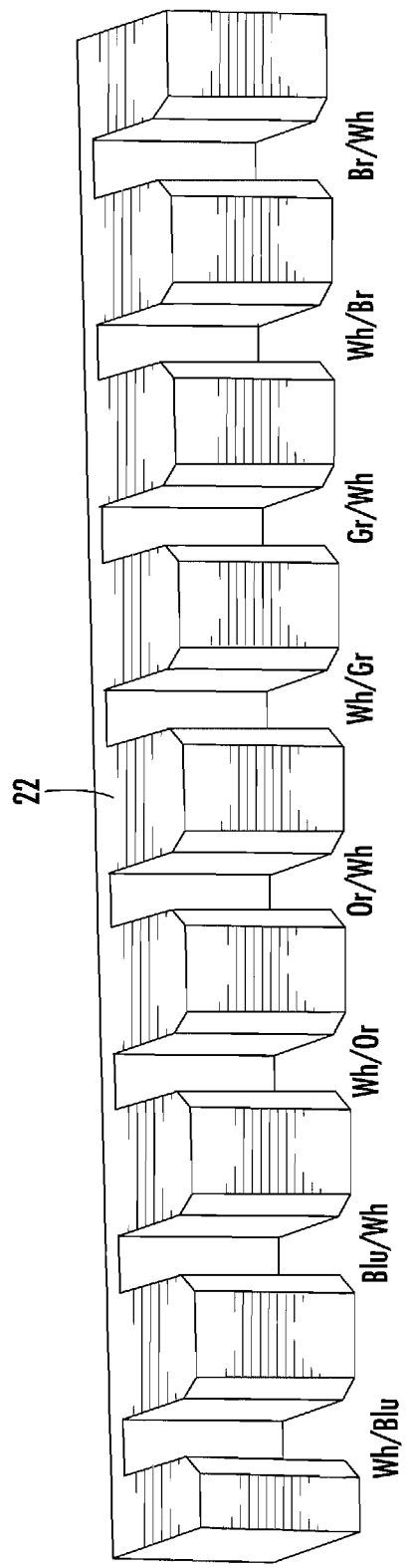
FIG. 6 is a close-up view of the 8 wire configuration on the back of the HD patch panel.

FIG. 6 shows a close up of a connection group (22). A traditional network cable contains 8 copper wires, color coded by the wire casing. FIG. 6 shows where each copper wire connects to the group (22) based on the color.

Figure 5:
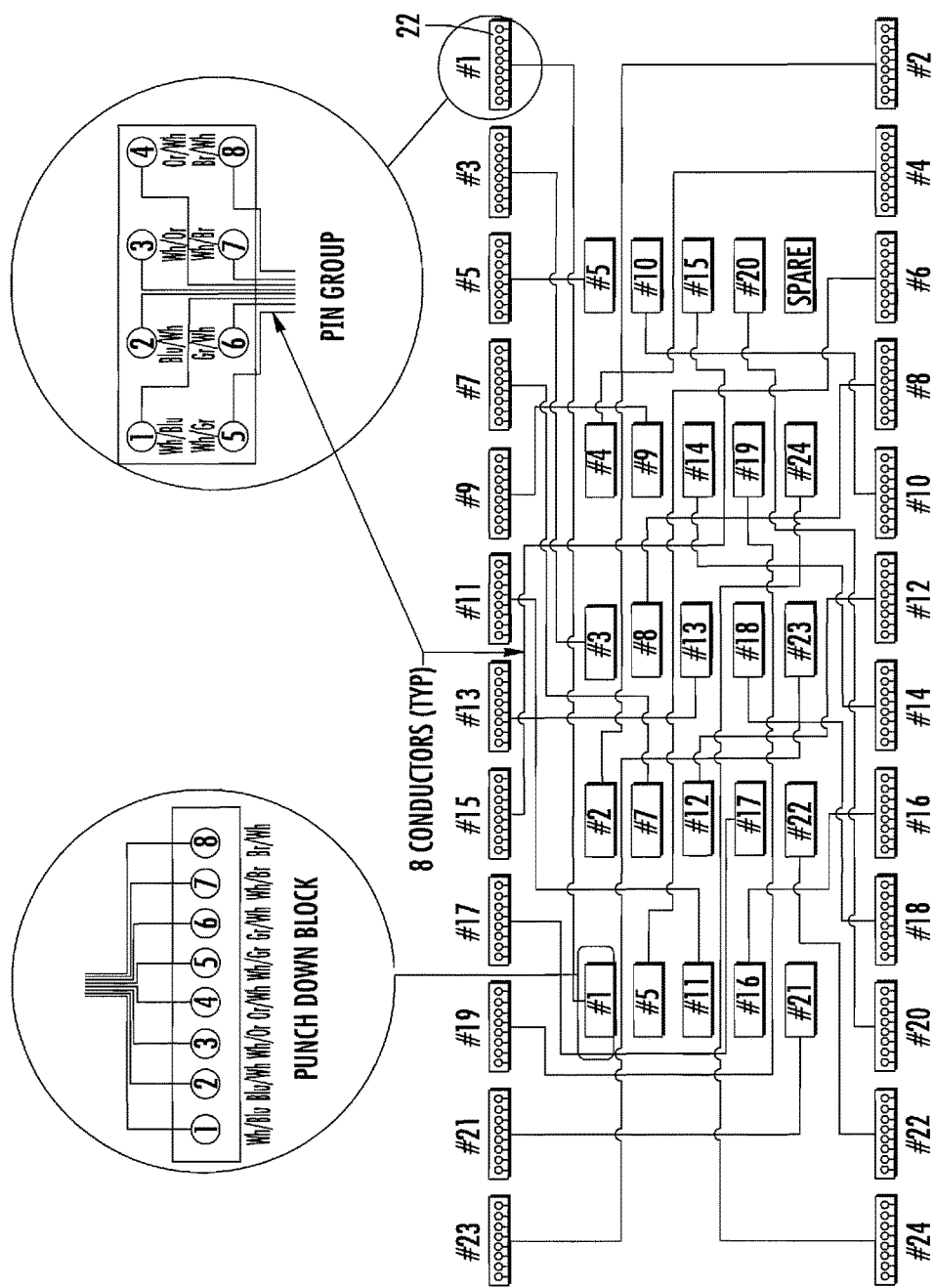
FIG. 5 is a schematic drawing of the jack pin layout of the 24-port HD patch panel.
Figure 31:
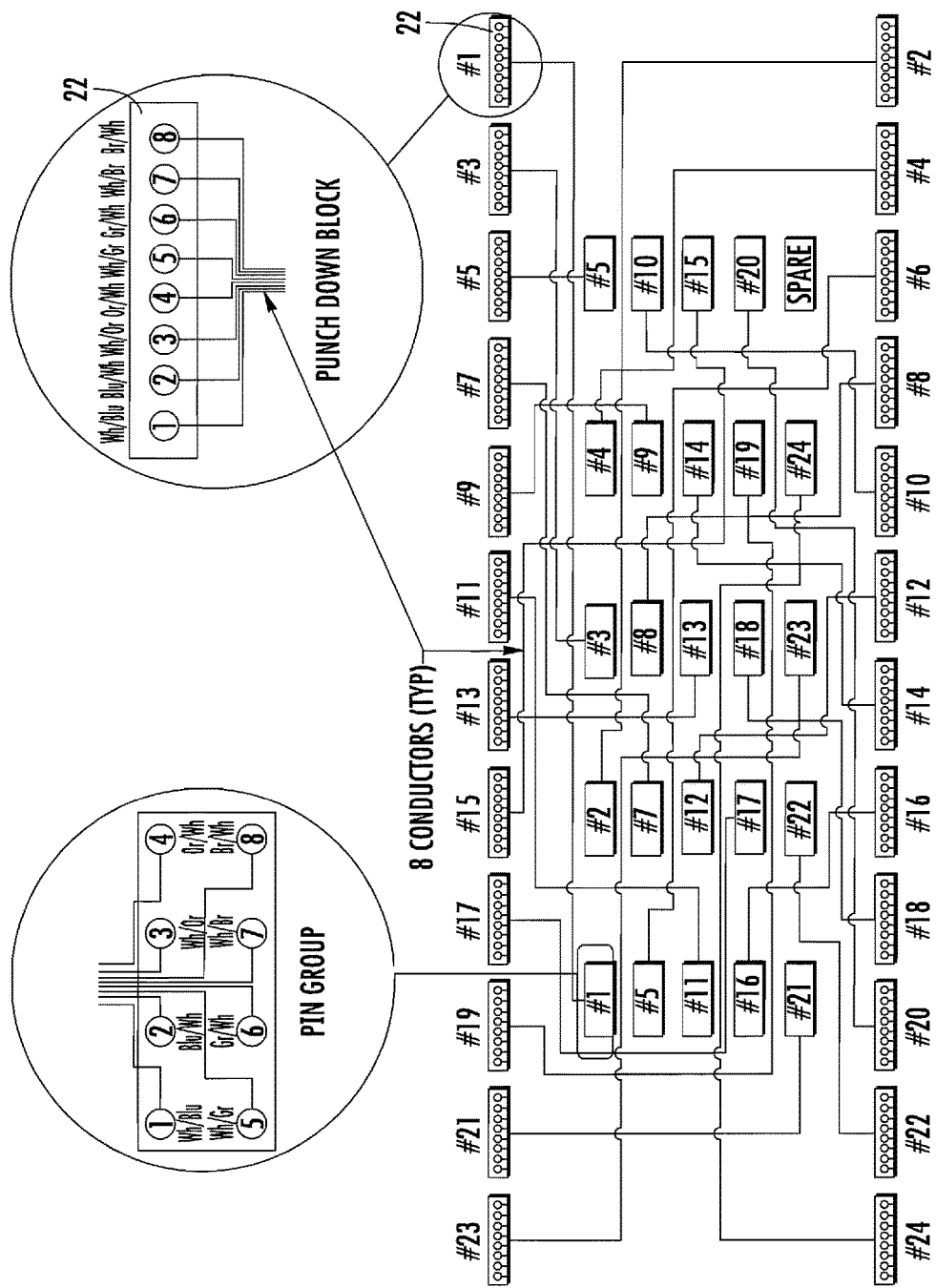
FIG. 31 is alternate embodiment of a wiring schematic demonstrating 8 spare conductors which can be used for optional accessories such as status indicator lights.

Looking to FIG. 5 and FIG. 31, a technical schematic is shown, disclosing the electrical configuration and relationship between the connection groups (22) on the rear face (18) of the HD patch panel (10), and the pin configuration in the HD jack (20) on the front face (16) of the HD patch panel (10).

Figure 7:
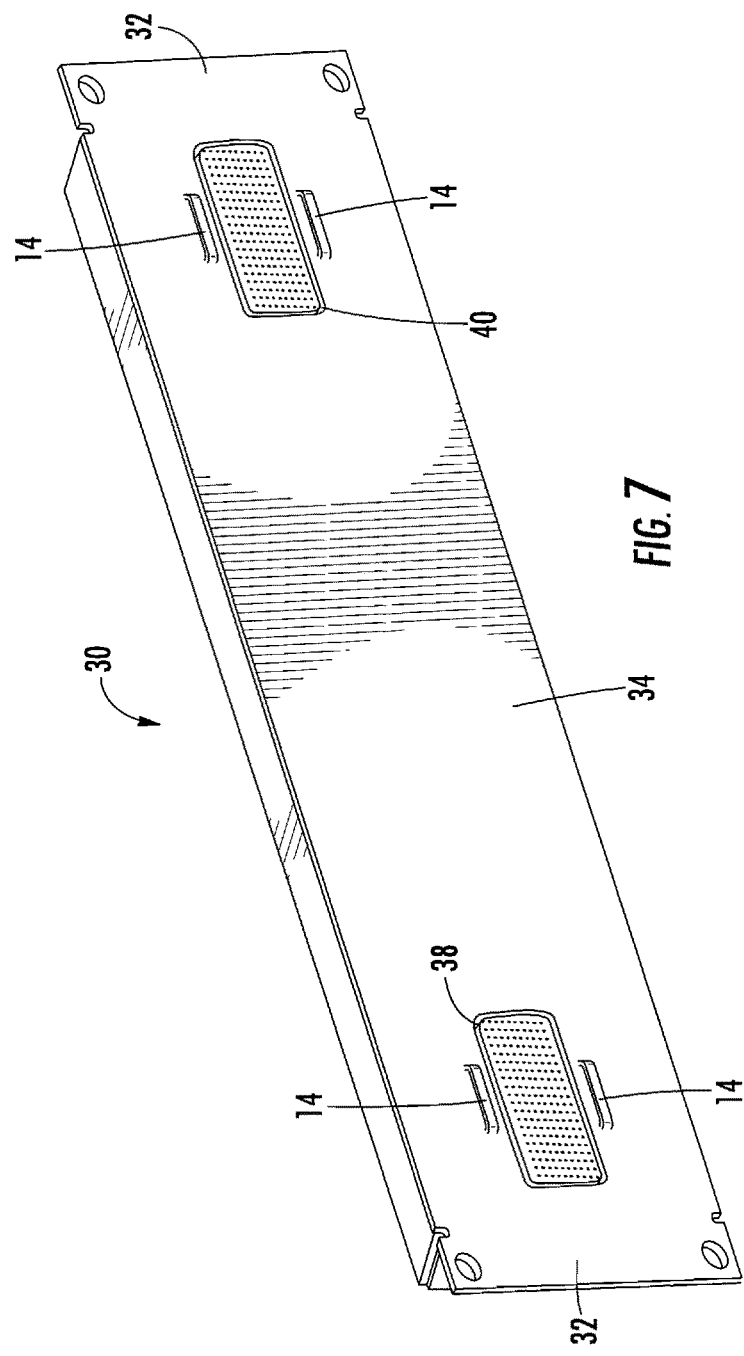
FIG. 7 is a front perspective view of a 48-port HD patch panel.
Figure 8:
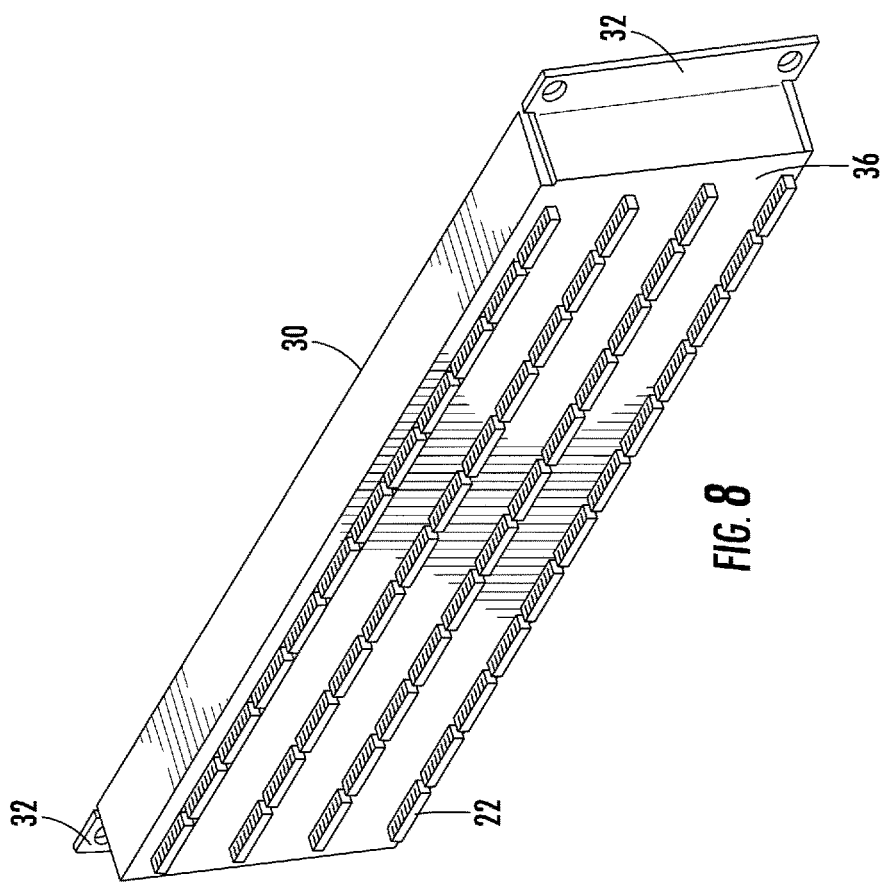
FIG. 8 is a rear perspective view of a 48-port HD patch panel.

FIGS. 7 and 8 show an alternate HD patch panel (30) with 48 ports. On the front face (34) of the 48-port HD patch panel (30) there is a first HD jack (38) and a second HD jack (40) as well as brackets (32) to attach the patch panel (30) to a network rack. On the rear face (36) there are 48 connection groups (22), where a first set of 24 cable connection groups corresponds to the first HD jack (38), and a second set of 24 cable connection groups corresponds to the second HD jack (44), using the same connection schematic as diagramed in FIG. 5 & FIG. 31.

Figure 9:
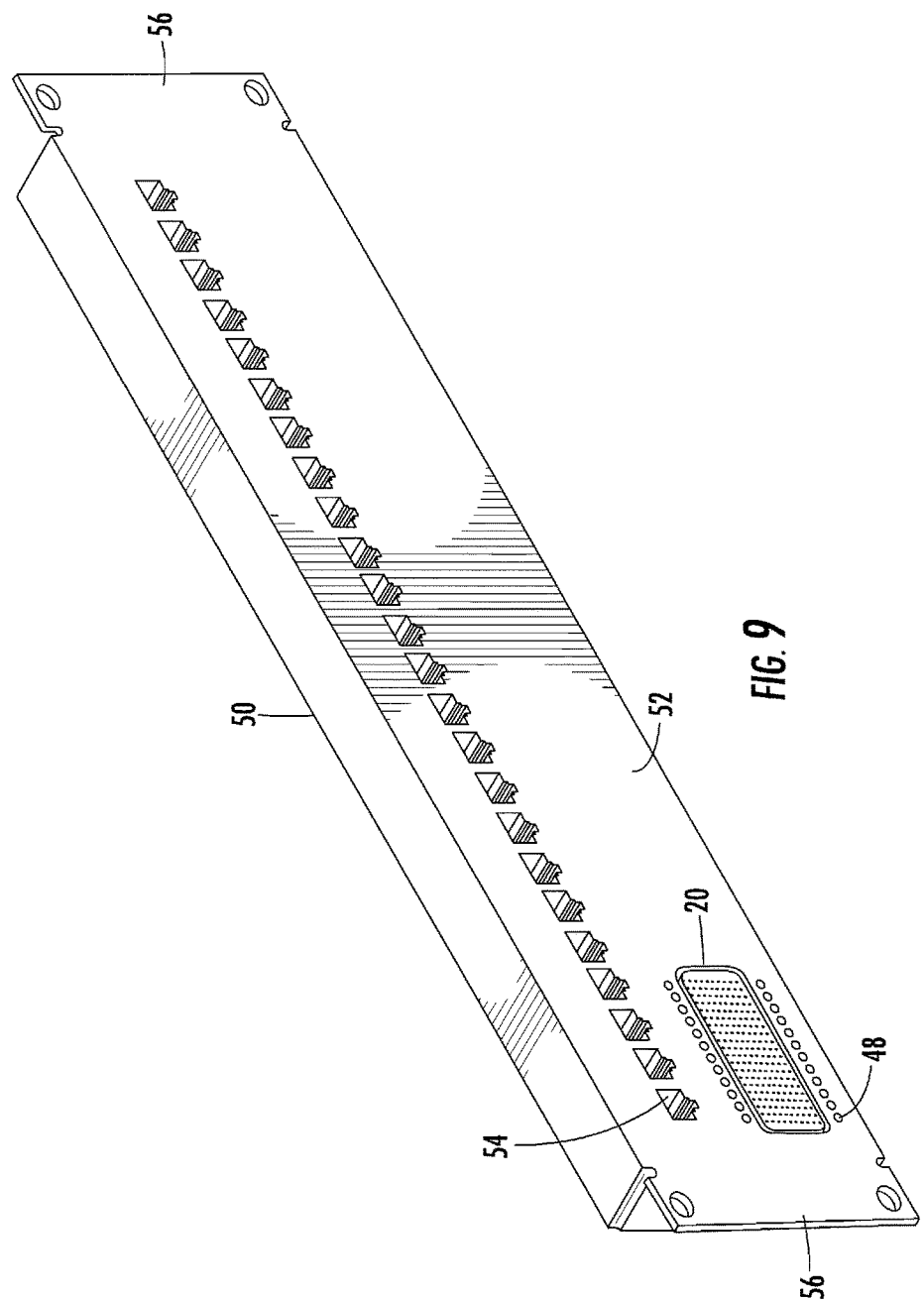
FIG. 9 is a front perspective view of an alternate embodiment of a 24-port HD patch panel with status indicator lights (HD Port Converter).
Figure 10:
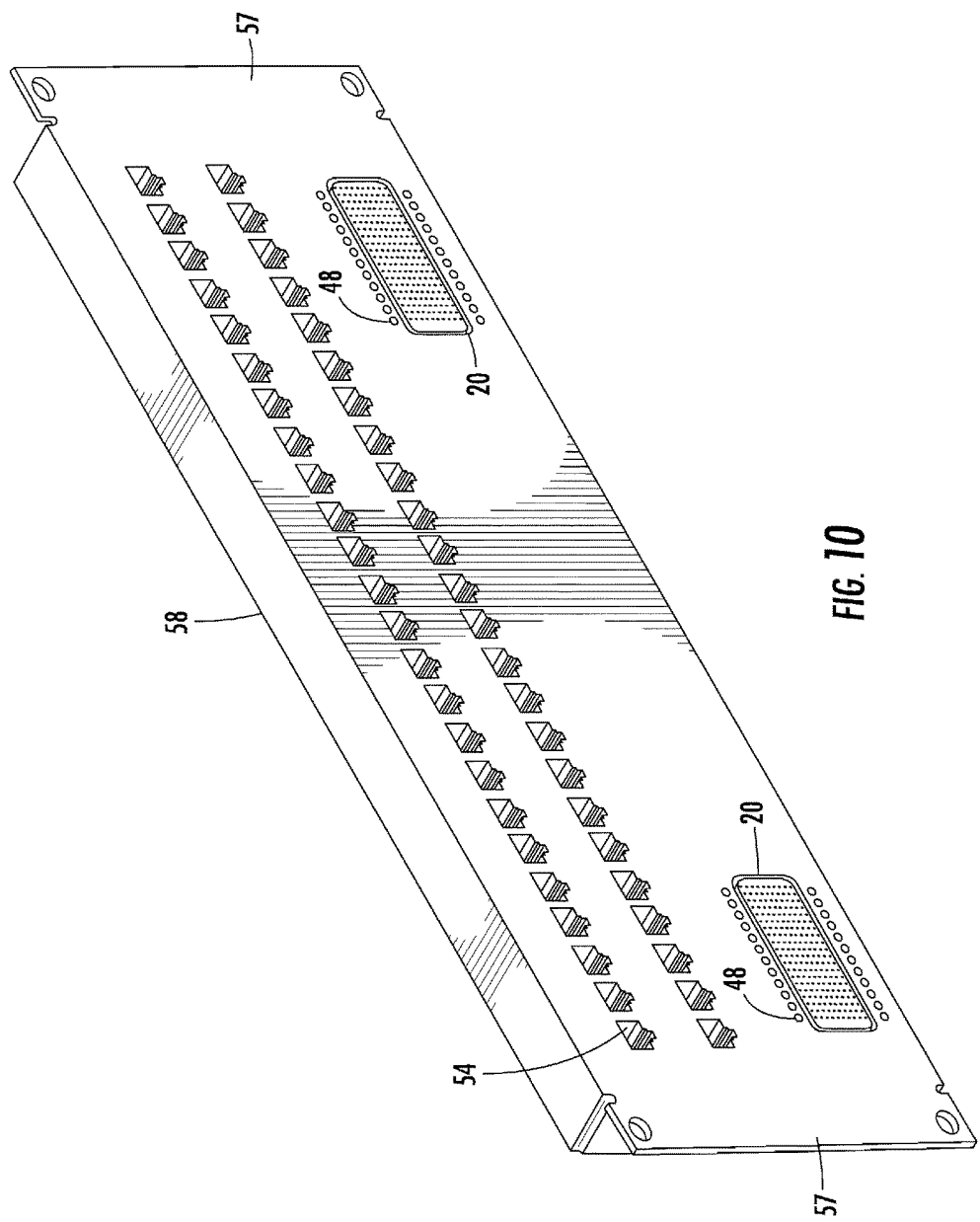
FIG. 10 is a front perspective view of an alternate embodiment of a 48-port HD patch panel with status indicator lights (HD Port Converter).
Figure 29:
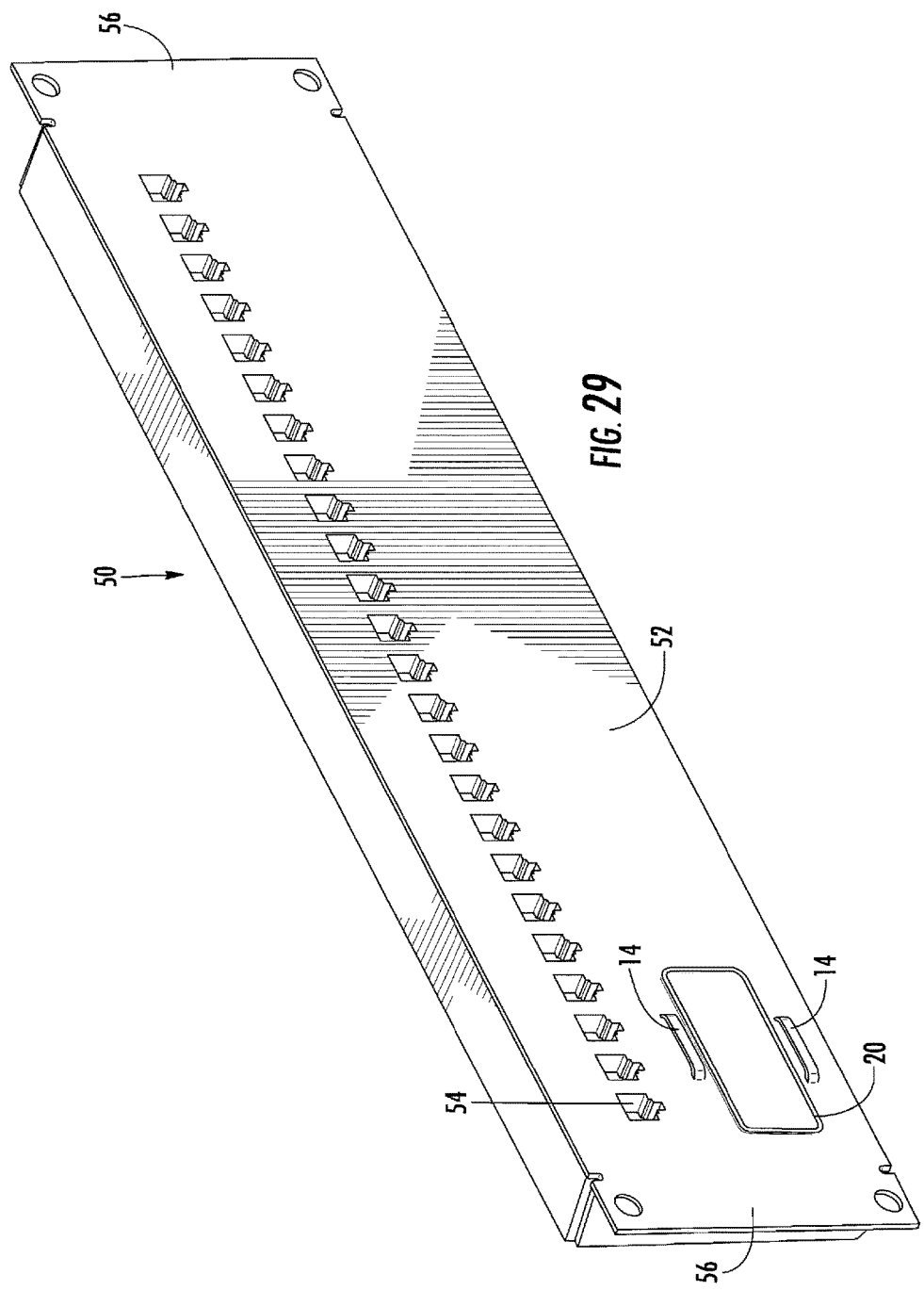
FIG. 29 is a front perspective view of an alternate embodiment of a 24-port HD patch panel (HD Port Converter).
Figure 30:
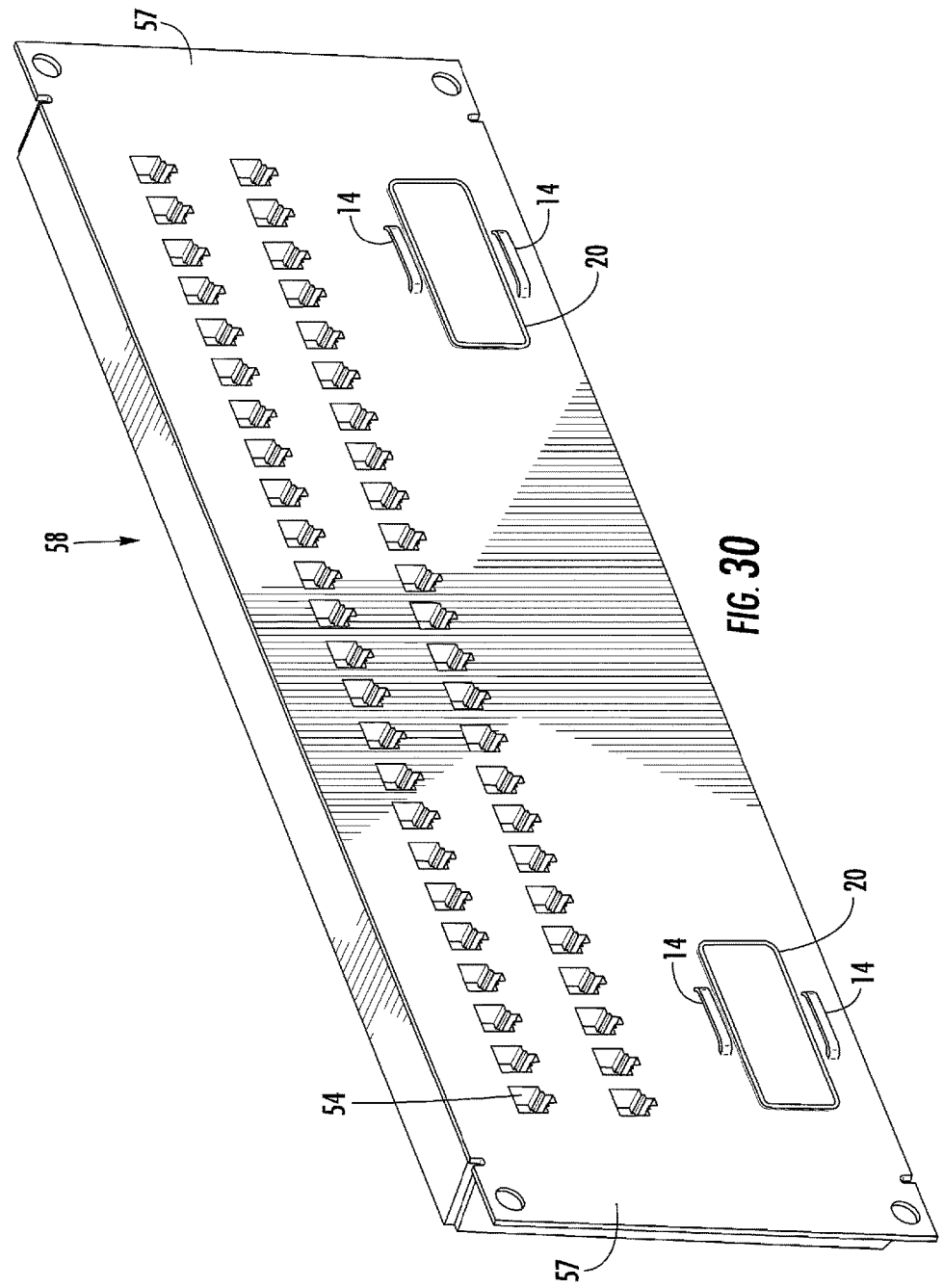
FIG. 30 is a front perspective view of an alternate embodiment of a 48-port HD patch panel (HD Port Converter).

In FIGS. 9, 10, 29 and 30, alternate input HD patch panels are shown. In FIG. 9 and FIG. 29, an alternate input 24-port standard connection, 24-port HD connection patch panel is shown (50). The front face (52) has an HD jack (20) and 24 standard 8 pin jack connections (54) instead of the hard wired configuration on the back of the panel. In FIGS. 10 and 30, the alternate input HD patch panel (58) is shown with two HD jacks (20), and two sets of 24 standard 8 pin jack connections (54). Each alternate input HD patch panel (50, 58) attaches to an equipment rack with brackets (56, 57). Additionally, indicator lights (48) are shown in FIG. 9 and FIG. 10 to indicate network activity for each connection, allowing a network administrator to quickly identify any connectivity problems. Furthermore, securing brackets (14) are shown in FIG. 29 and FIG. 30

Figure 11:
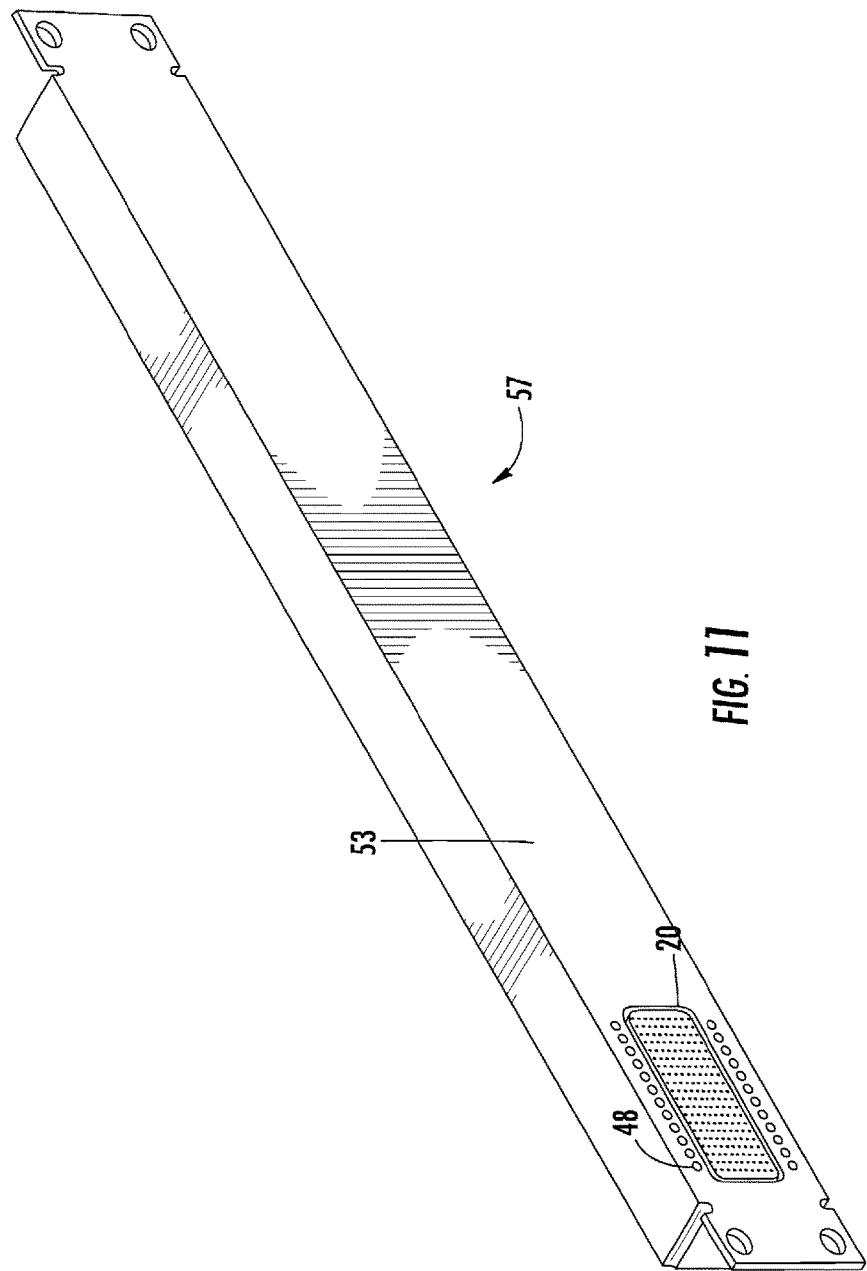
FIG. 11 is a front perspective view of an alternate embodiment of a 24-port HD patch panel with indicator lights.
Figure 12:
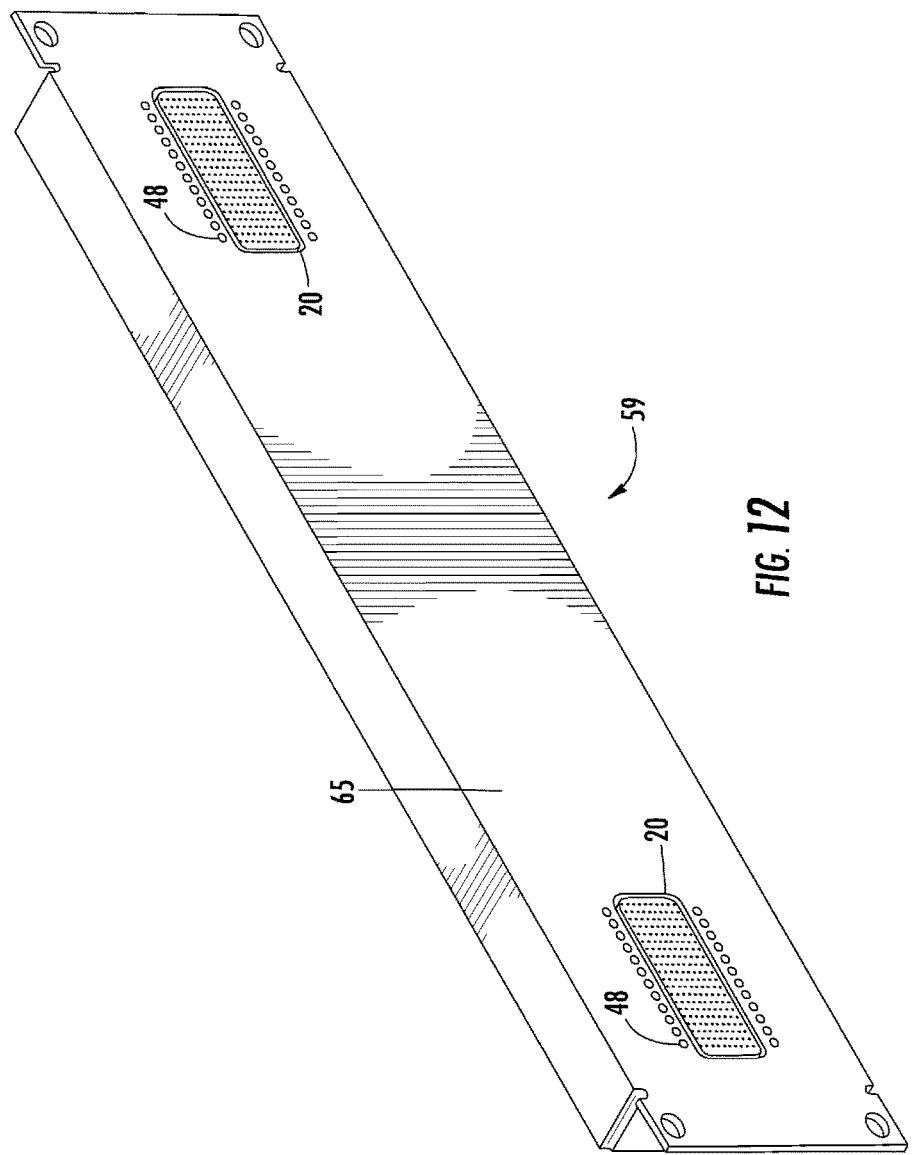
FIG. 12 is a front perspective view of an alternate embodiment of a 48-port HD patch panel with indicator lights.

In FIGS. 11 and 12, alternate embodiments of the 24-port (51) and 48-port (59) HD patch panels are shown. With these embodiments, the front faces (53, 65) employ indicator lights (48) to alert a network administrator to activity of the connections in the HD jacks (20).

Figure 13:
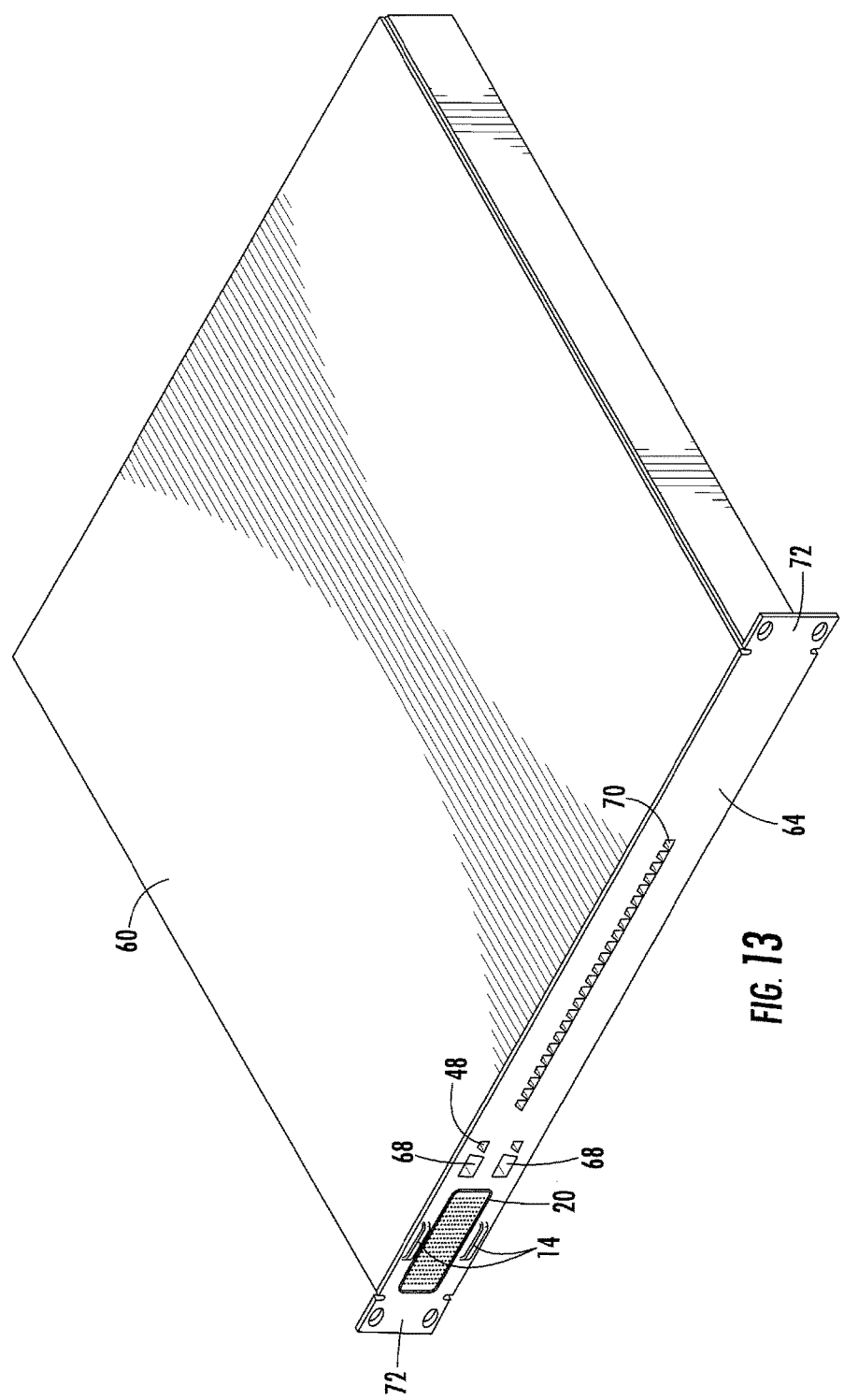
FIG. 13 is a front perspective view of a 24-port HD switch.
Figure 14:
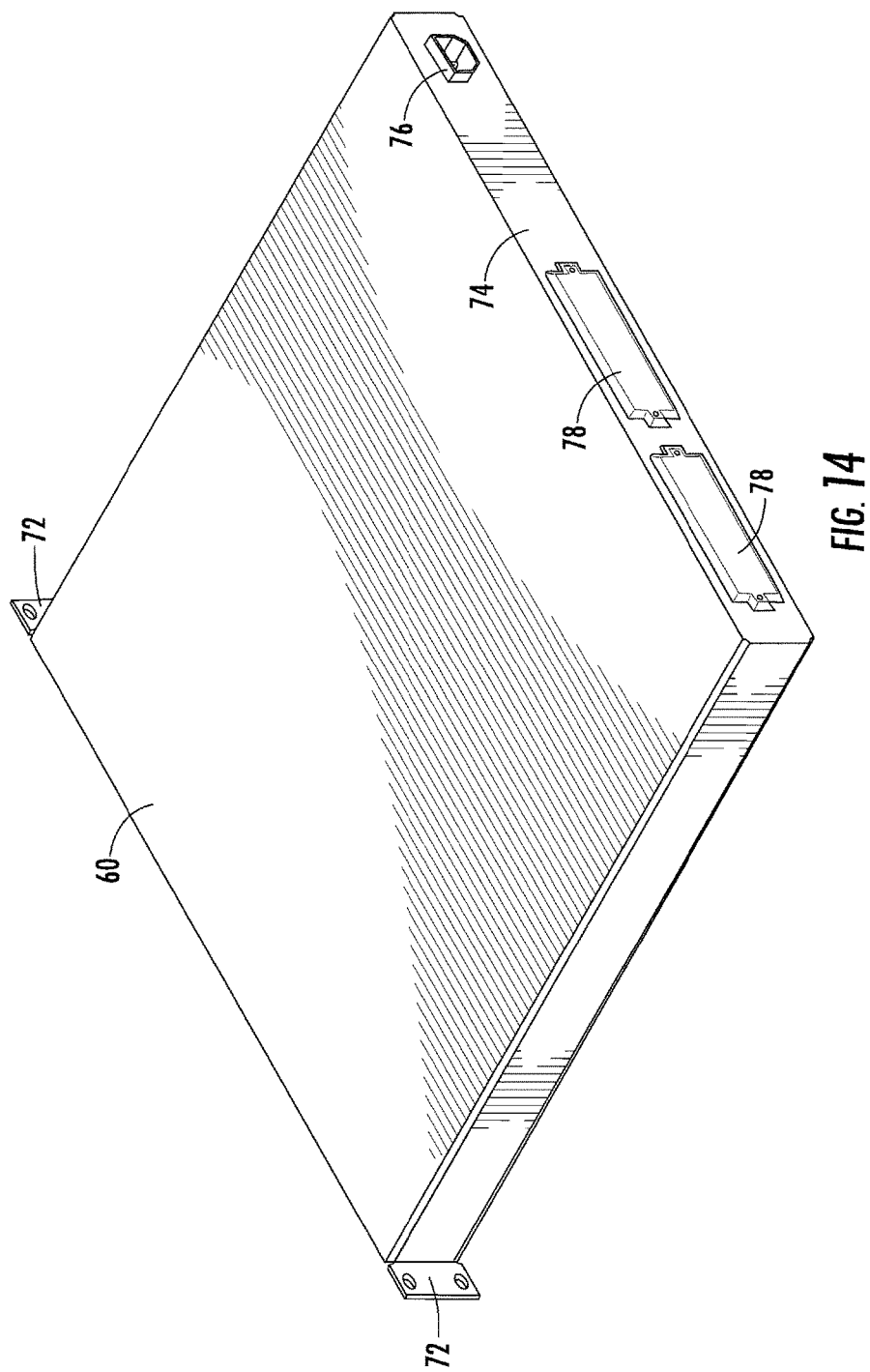
FIG. 14 is a rear perspective view of a 24-port HD switch.

FIGS. 13-22 disclose different embodiments of HD switches. In FIG. 13, an HD switch (60) is disclosed, with a single HD jack (20) accommodating up to 24 UTP network ports. The front face (64) has an HD jack (20) input as well as two high throughput uplink ports (68). Additionally, there are indicator lights (70) which indicate activity each connection. Each individual connection contained within the HD jack is represented in the row of lights (70) on the front face (64), and each of the ports (68) have indicator lights (48) next to them, showing activity in those ports. The HD switch (60) also contains brackets (72) to connect the switch (60) to an equipment rack, as well as securing brackets (14). On the rear face (74) of the switch (60), shown in FIG. 14, is a power input (76) and two accessory panels (78).

Figure 15:
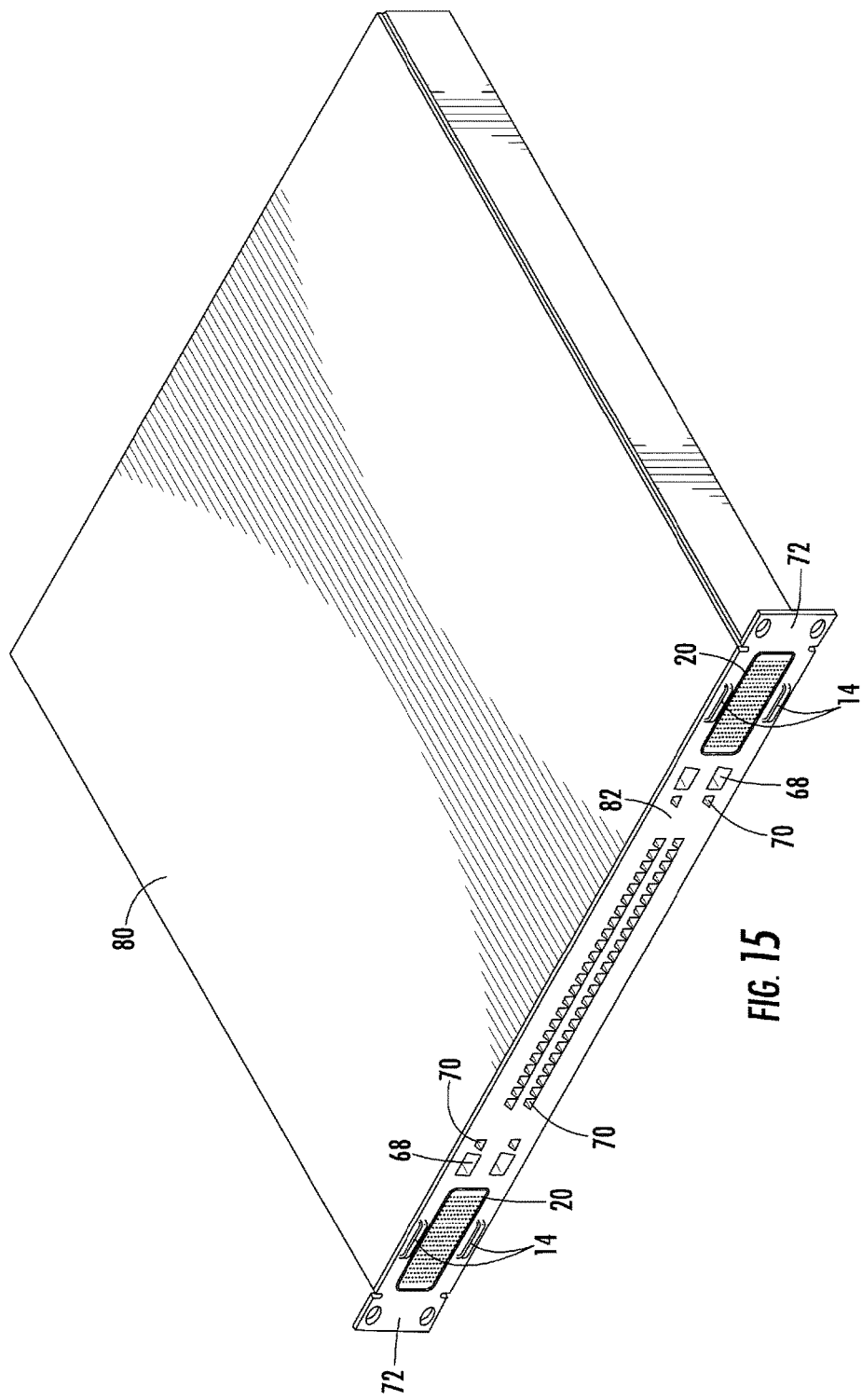
FIG. 15 is a front perspective view of a 48-port HD switch.
Figure 16:
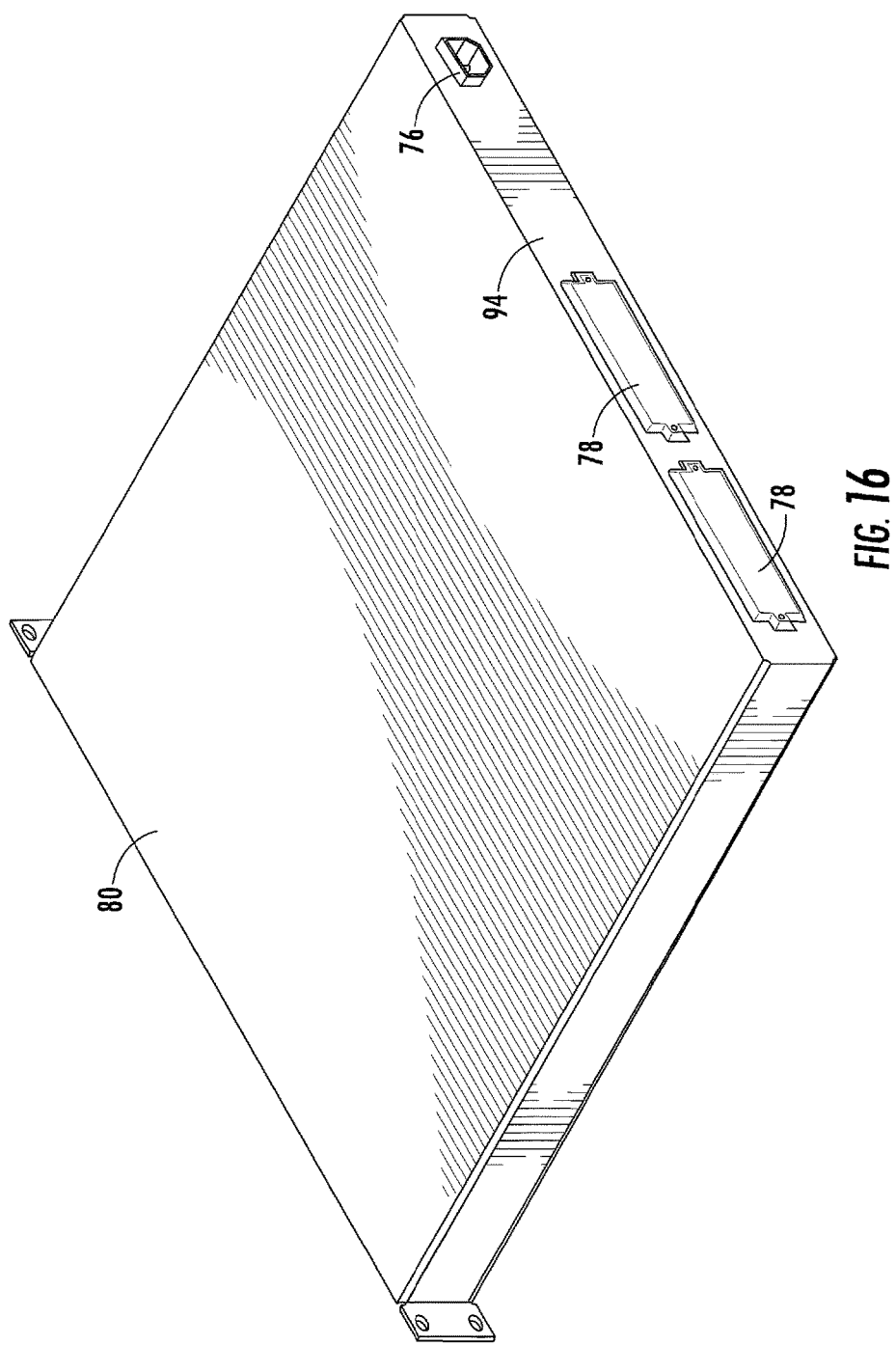
FIG. 16 is a rear perspective view of a 48-port HD switch.

An alternate HD switch (80) having two HD jacks, accommodating up to 48 UTP network ports is disclosed in FIG. 15. On the front face (82) there are two HD jacks (20), as well as two sets of high throughput uplink ports (68). Also shown are indicator lights (70) arranged to correspond with each connection, either through the HD jacks (20) or the high throughput uplink ports (68). Brackets (72) are used to connect the switch (80) to the equipment rack. On the rear face (94), shown in FIG. 16, there is a power input (76), and a pair of accessory panels (78).

Figure 17:
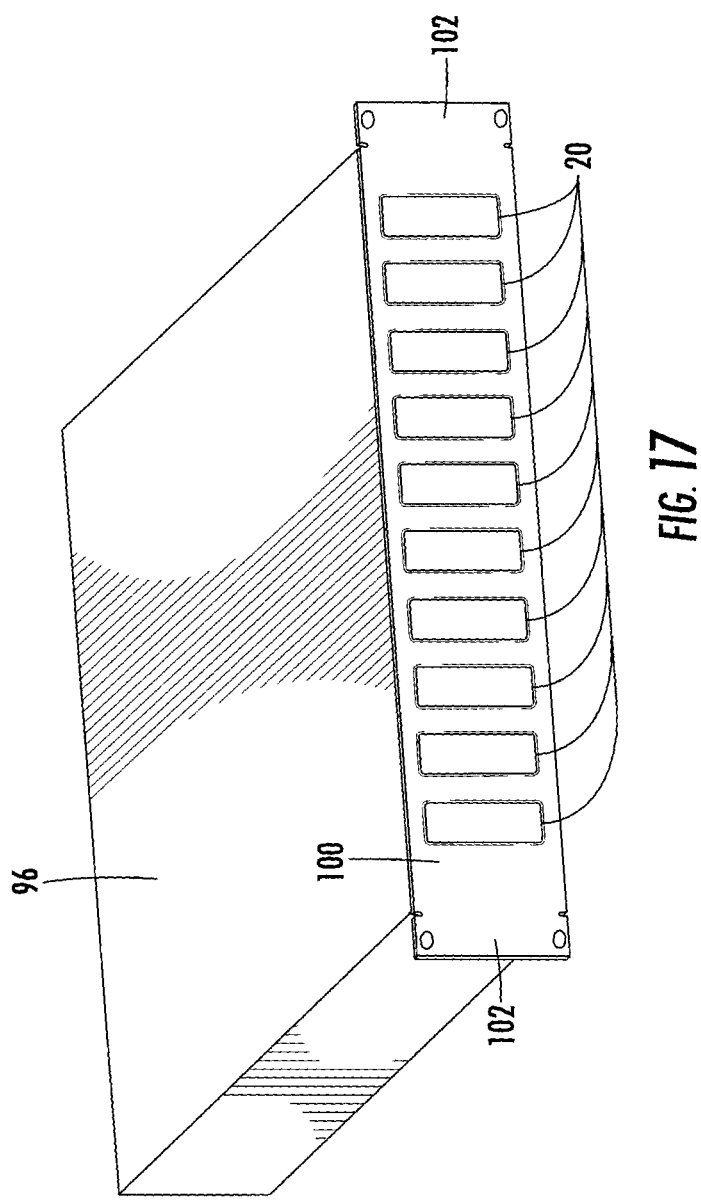
FIG. 17 is a front perspective view of a 240-port HD switch.
Figure 18:
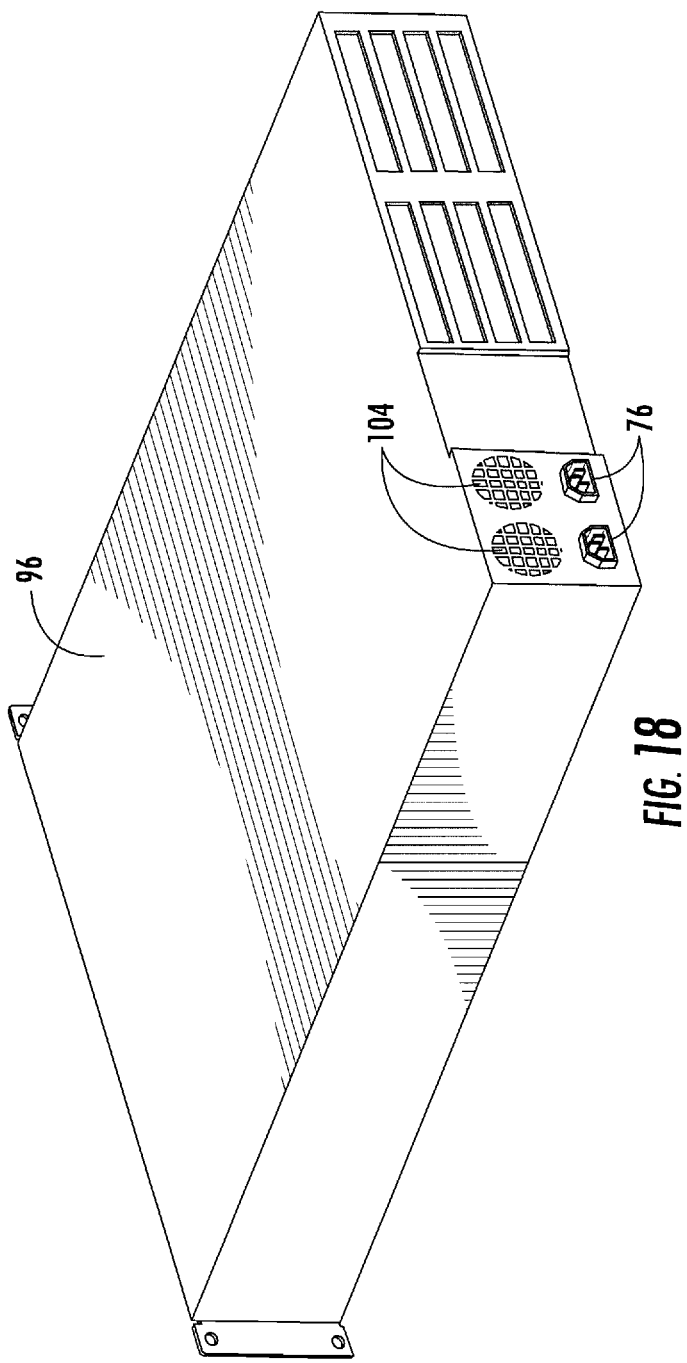
FIG. 18 is a rear perspective view of a 240-port HD switch.
Figure 19:
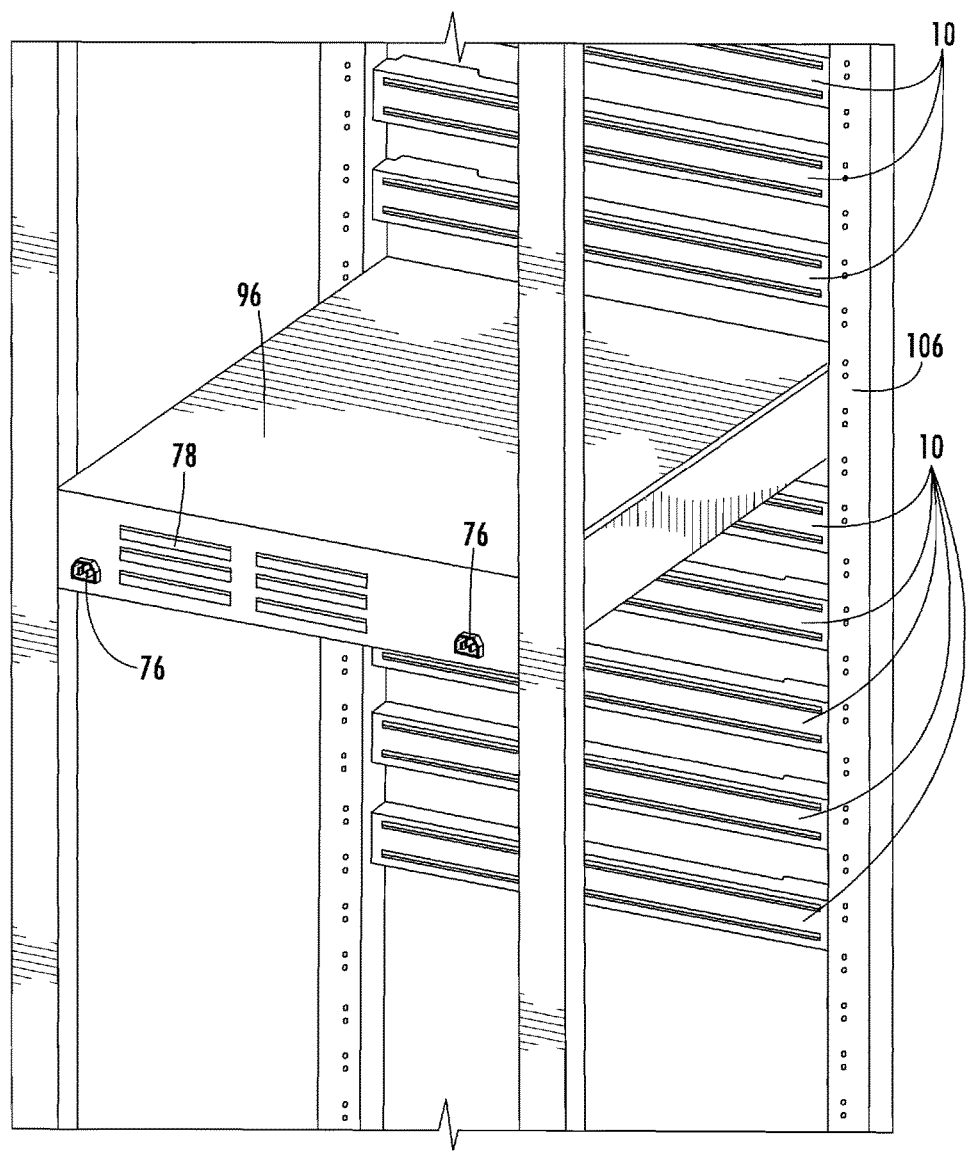
FIG. 19 is a rear perspective view of a rack containing 1 240-port HD switch and HD patch panel setup.
Figure 20:
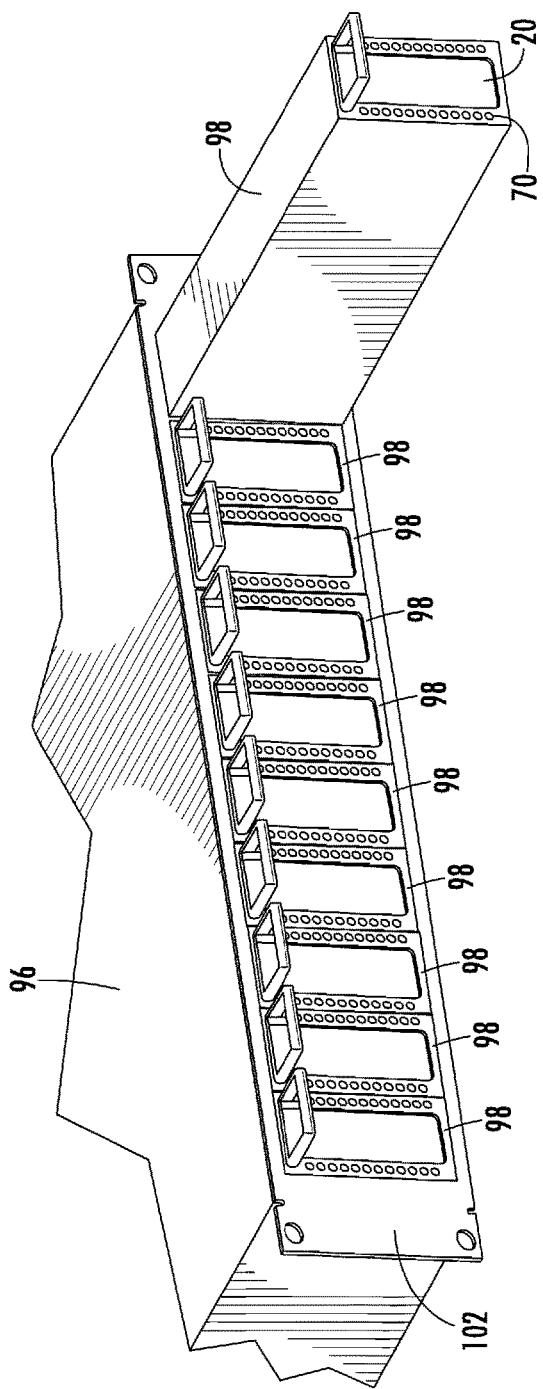
FIG. 20 is a front perspective view of a 240-port HD switch with removable switch modules.
Figure 21:
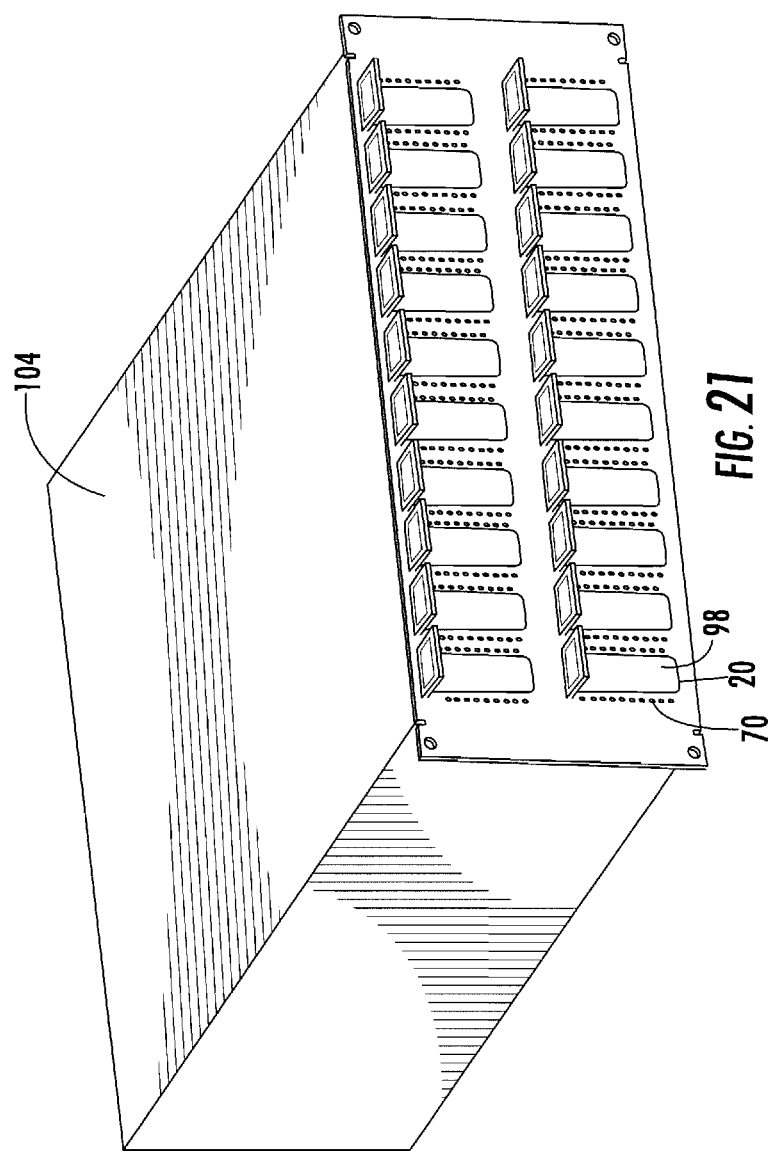
FIG. 21 is a front perspective view of a 480-port HD switch.
Figure 22:
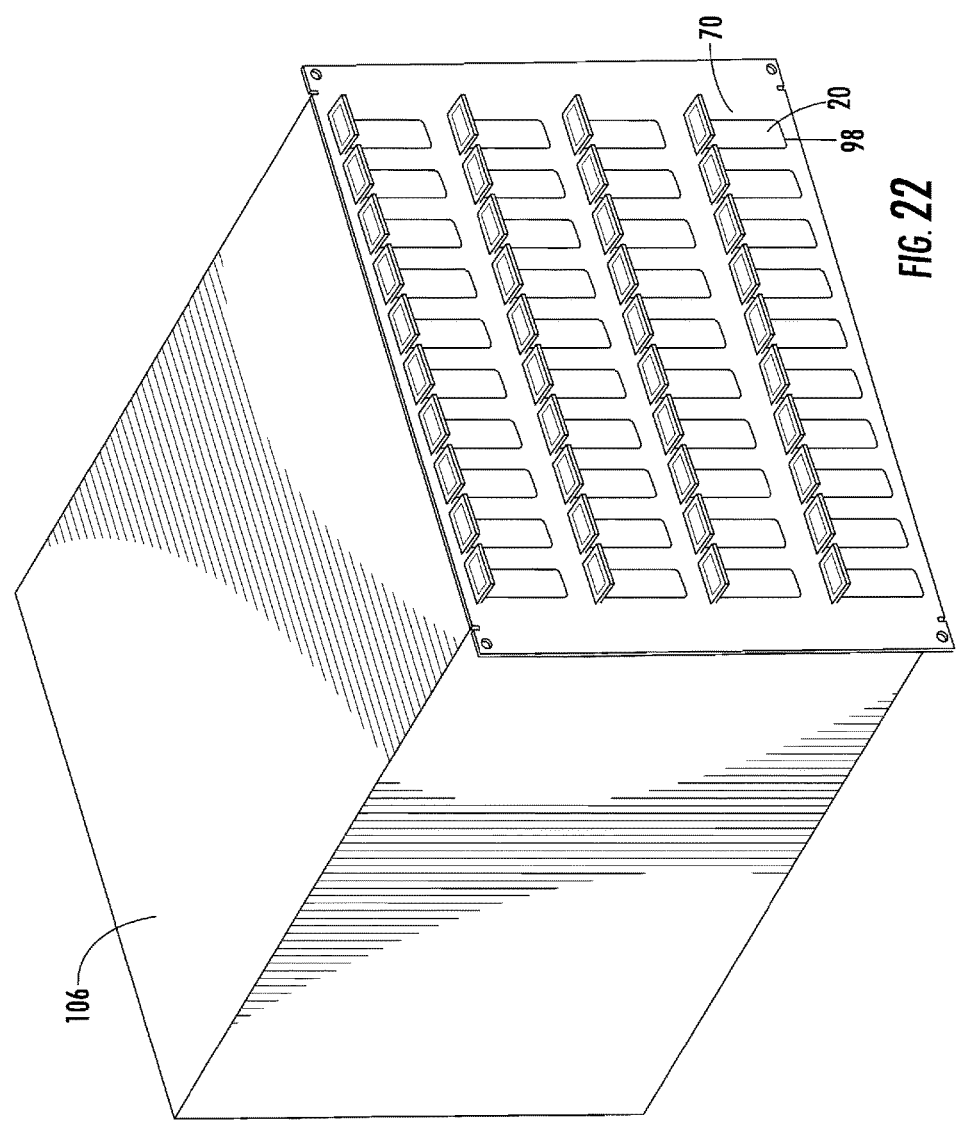
FIG. 22 is a front perspective view of a 960-port HD switch.

FIG. 17 shows a 240-port HD switch (96), arranged with 10 HD jack inputs (20) on the front face (100), which can attach to an equipment rack with brackets (102). In FIG. 18, on the rear there are two power inputs (76), as well as ventilation panels (104) to prevent overheating as well as accessory panels (78). In FIG. 19, a 240-port HD switch (96) is connected to a rack (106), with a series of HD patch panels (10) above and below. In FIG. 20, the 240-port HD switch (96) is shown with removable panels (98). Each of the removable panels (98) has a 24-port HD jack (20), and contains network activity indicator lights (70). In FIG. 21, the idea is further expanded to include a 480-port HD switch (104). FIG. 22 shows a 960-port HD switch (106). The 240-port, 480-port, and 960-port HD switch also incorporate removable panels (98) for each 24-port HD jack, with indicator lights (70) for each data connection line within each 24-port HD jack (20).

Figure 23:
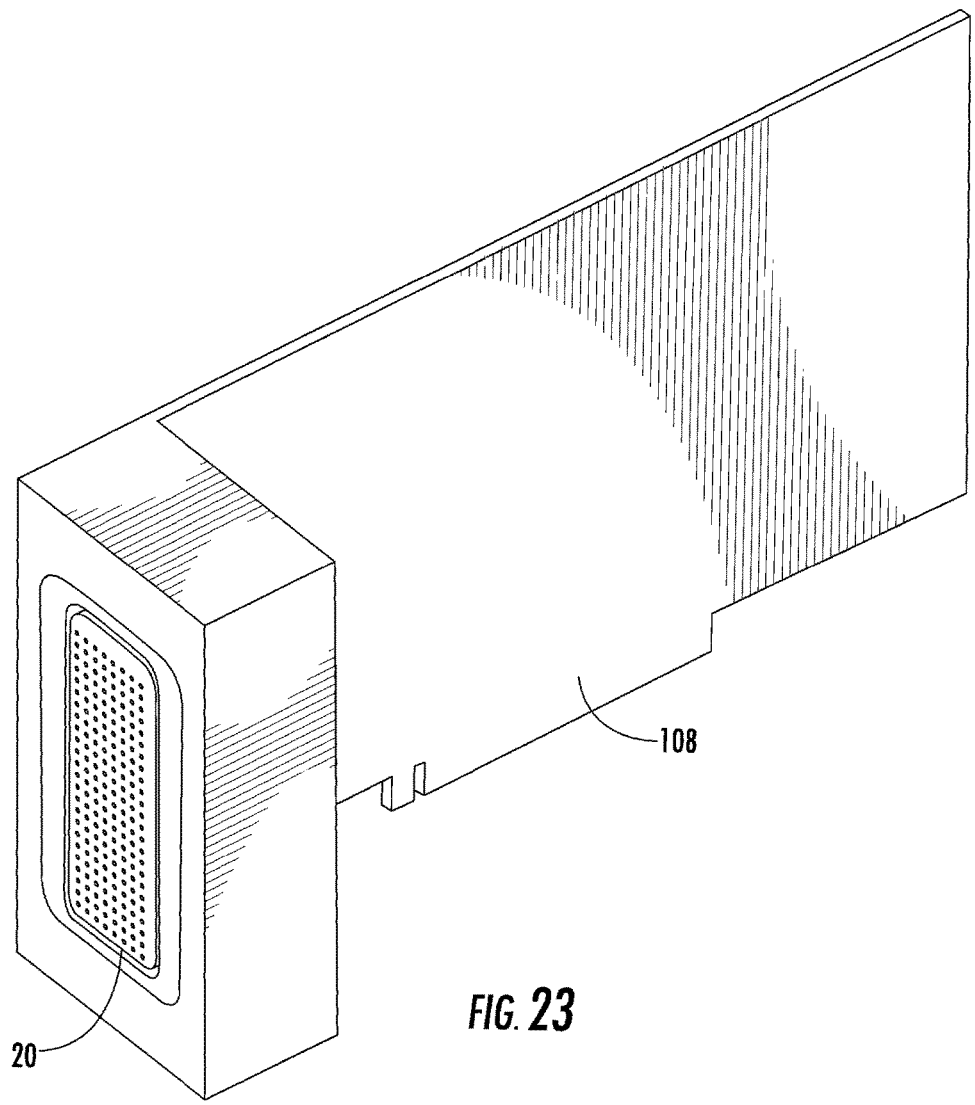
FIG. 23 is perspective view of a computer board with a HD jack connection.

FIG. 23 shows a printed circuit board (PCB) (108) containing an HD jack (20). These HD PCBs can be added to a computer/server enabling network administrators the ability to make their own network switches. Additionally, with the widespread use of virtualization software, one can truly deploy an "Office in a Box" solution by adding HD PCBs to a physical server running virtual applications, one of which would be virtualized network switching software. Using the HD PCB (108) allows for smaller networks to deploy and manage less network equipment and less cabling. This reduces the amount of hardware needed, installation time, space, energy, and cost.

Figure 24:
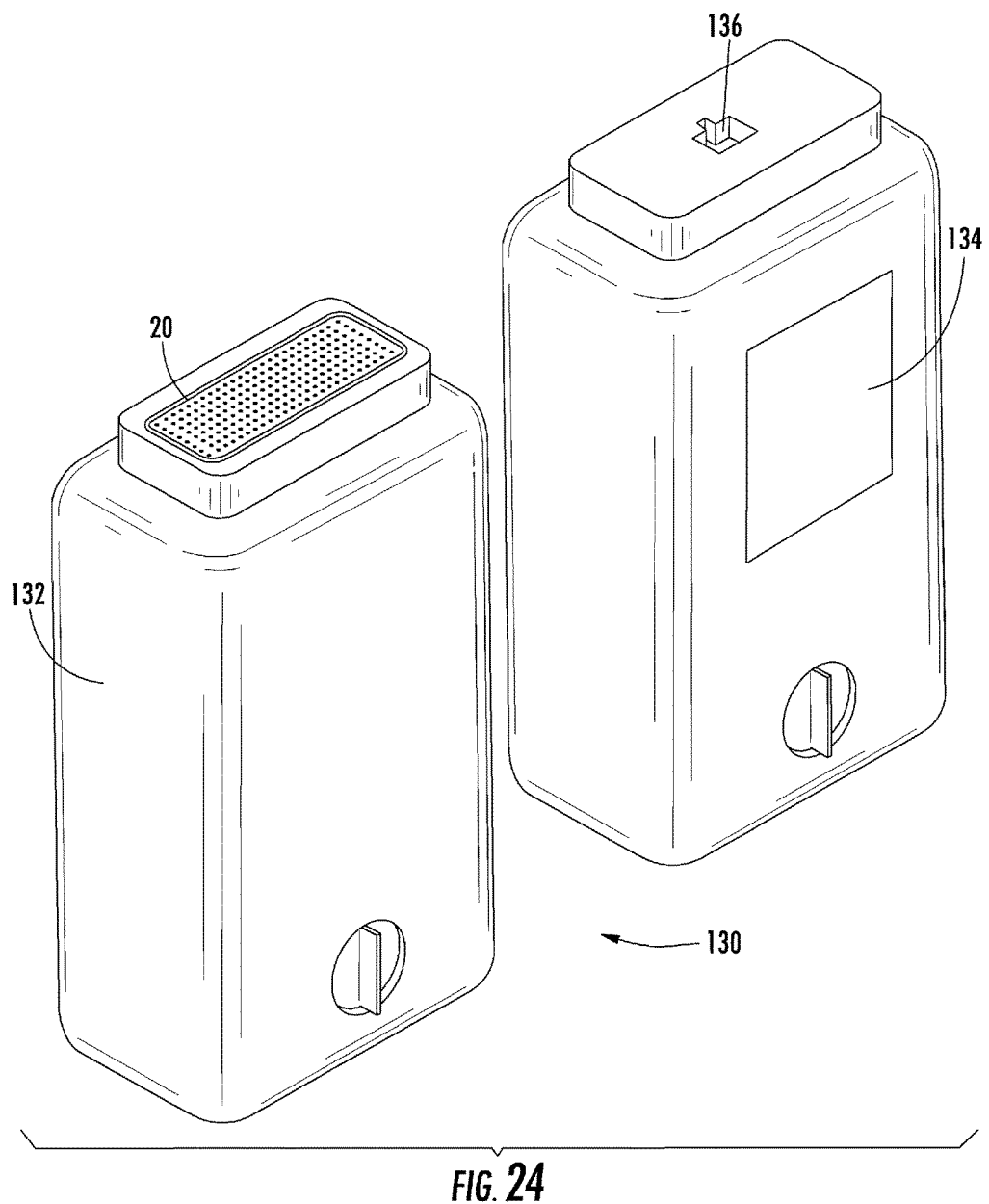
FIG. 24 is a perspective view of a set of an HD cable analyzer.

FIG. 24 shows how cable analyzers (130) can incorporate the HD jack (20). Here, by plugging the first cable analyzer (132) into the HD jack (20) on the HD patch panel (10,30) a user can go check each of the 24 remote network station connections extending from the HD patch panel by attaching the second cable analyzer (134) at the remote location. The second cable analyzer (134) has a standard network connection port (RJ45) (136) so that it can attach to the network cable at the remote network station to test the cable connection. A network administrator can also perform the same operation when testing a traditional 24 port non-HD patch panel by connecting an HD split cable (FIGS. 27, 28, and 33) (110) to a legacy patch panel.

Figure 25:
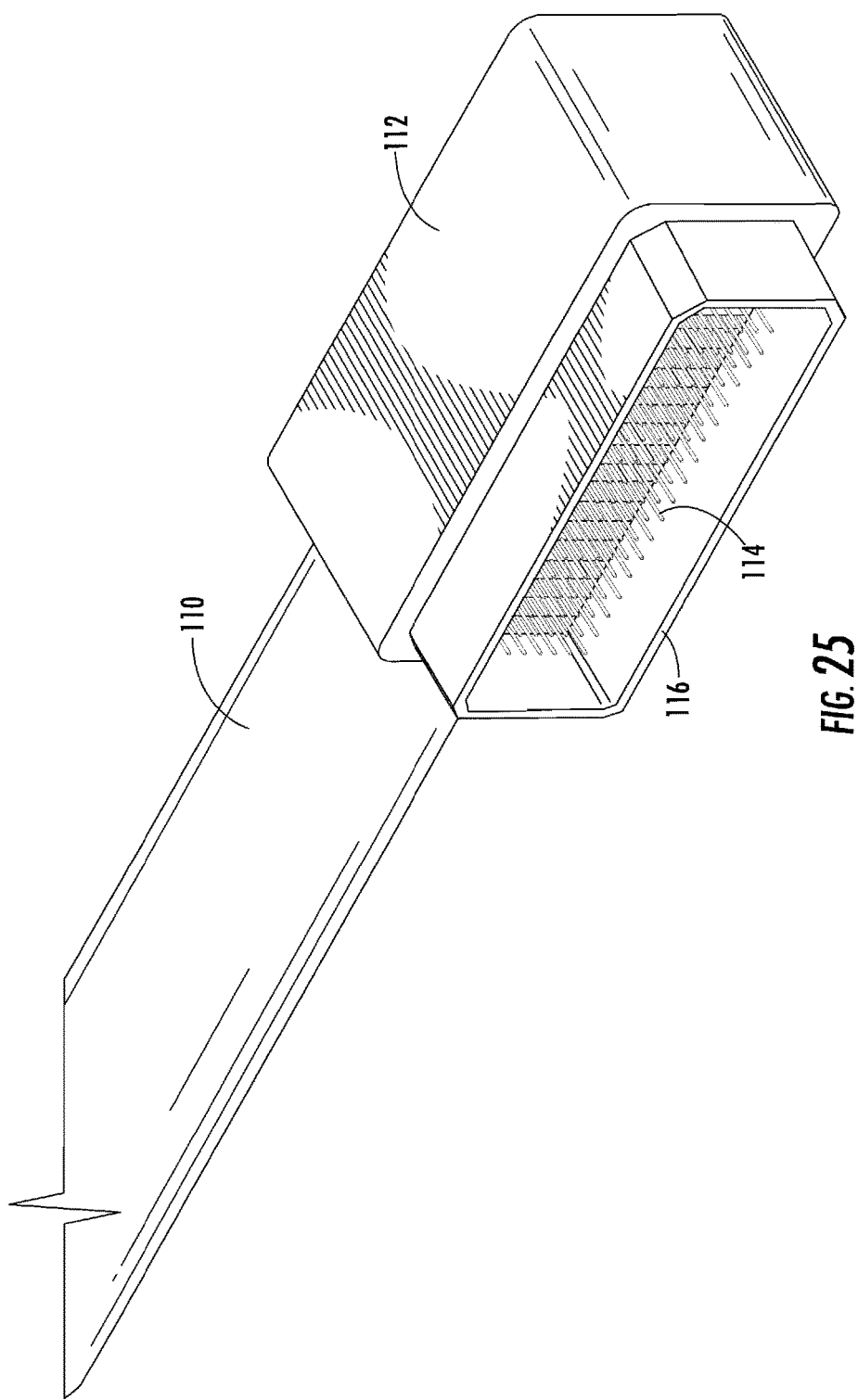
FIG. 25 is front perspective view of a HD cable head.
Figure 26:
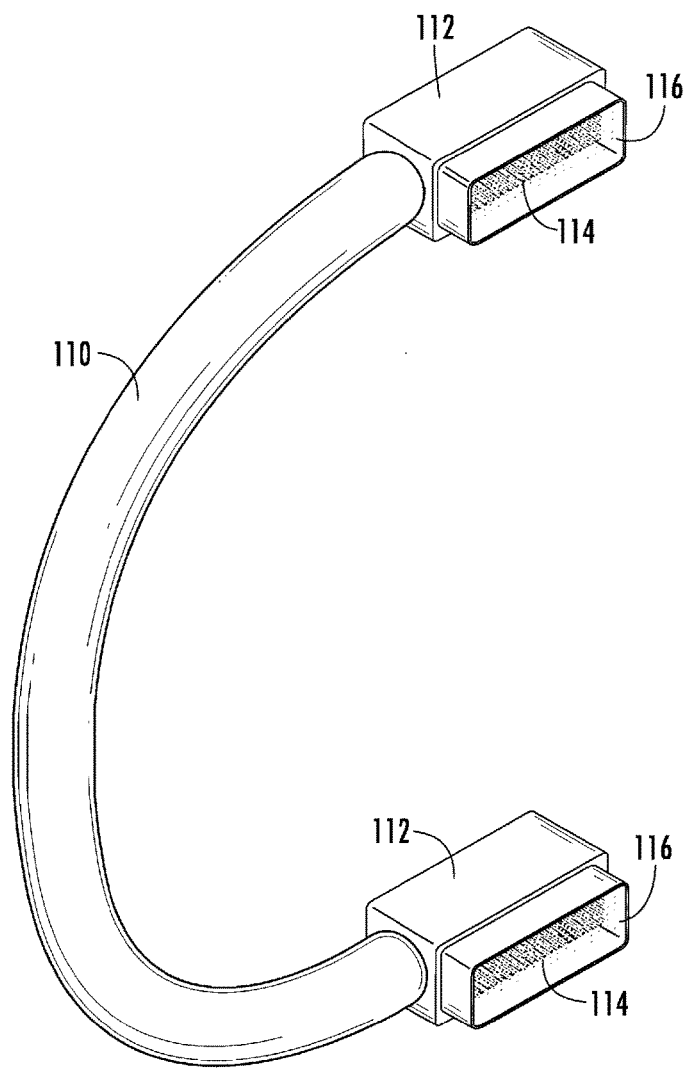
FIG. 26 is a front perspective view of a HD cable.
Figure 32:
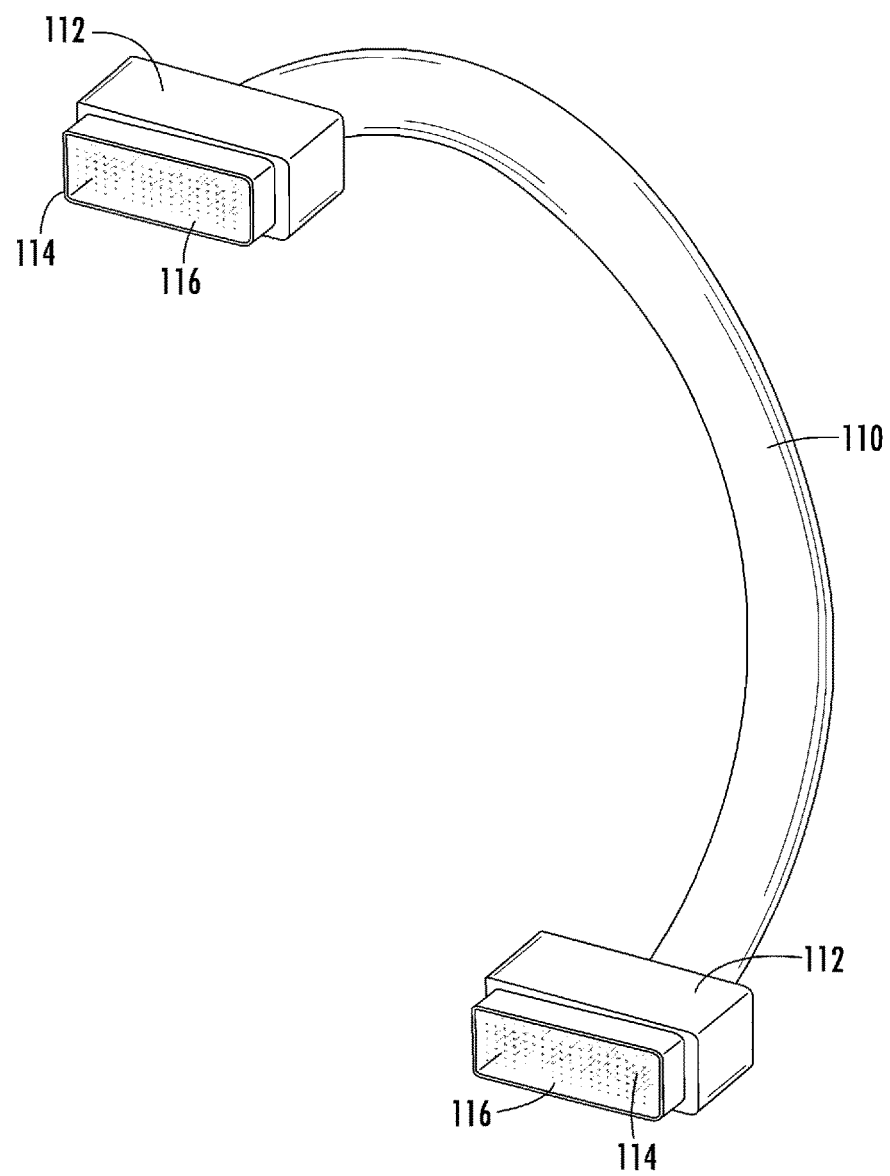
FIG. 32 is an alternate embodiment front perspective view of an HD cable.

FIG. 25 shows the HD plug (112) with an HD pin configuration (114) and surrounding wall (116), which corresponds with an HD jack. The pin configuration (114) shows a copper wire connection for each connection, in groups of 8, corresponding to the configuration laid out in the schematic in FIG. 5 and FIG. 31. The copper wire connections are then grouped together and insulated within the HD cable (118). In FIG. 26 and FIG. 32, an HD cable (110) is shown with an HD plug (112) on each end, so that it can connect a device equipped with an HD jack to another device equipped with an HD jack.

Figure 27:
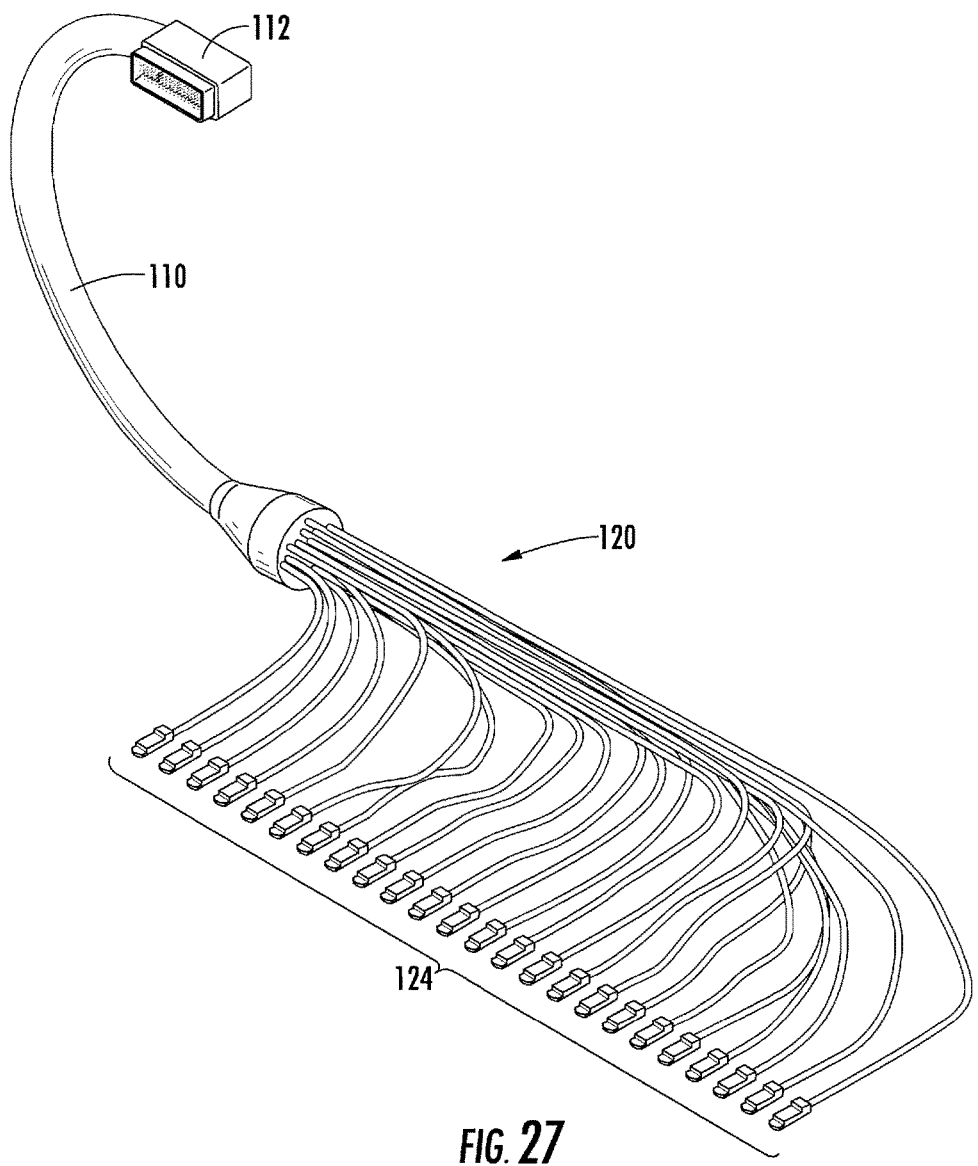
FIG. 27 is a front perspective view of an HD split cable with standard UTP connectors.
Figure 28:
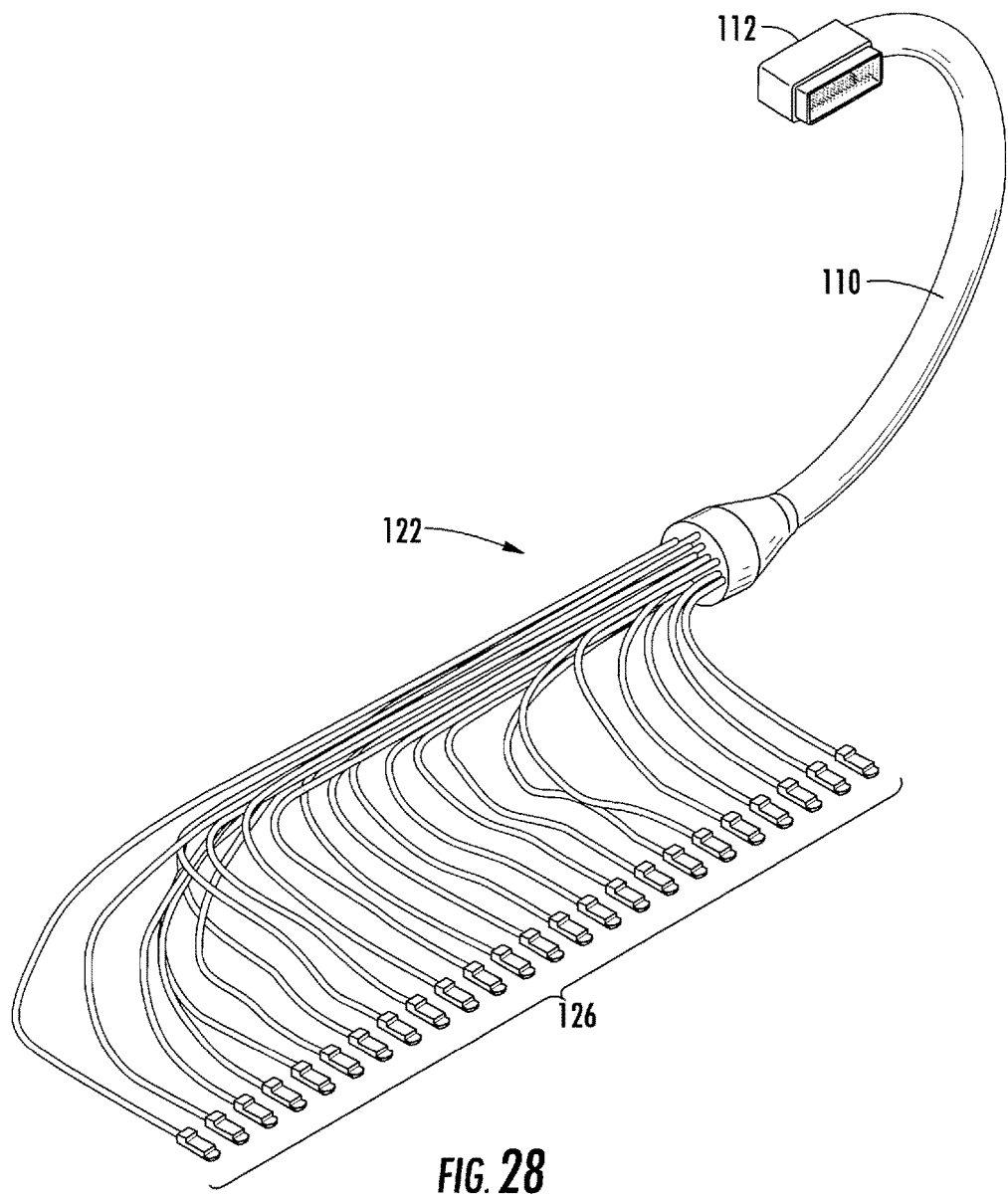
FIG. 28 is a front perspective view of an HD split cable with jack port connectors.
Figure 33:
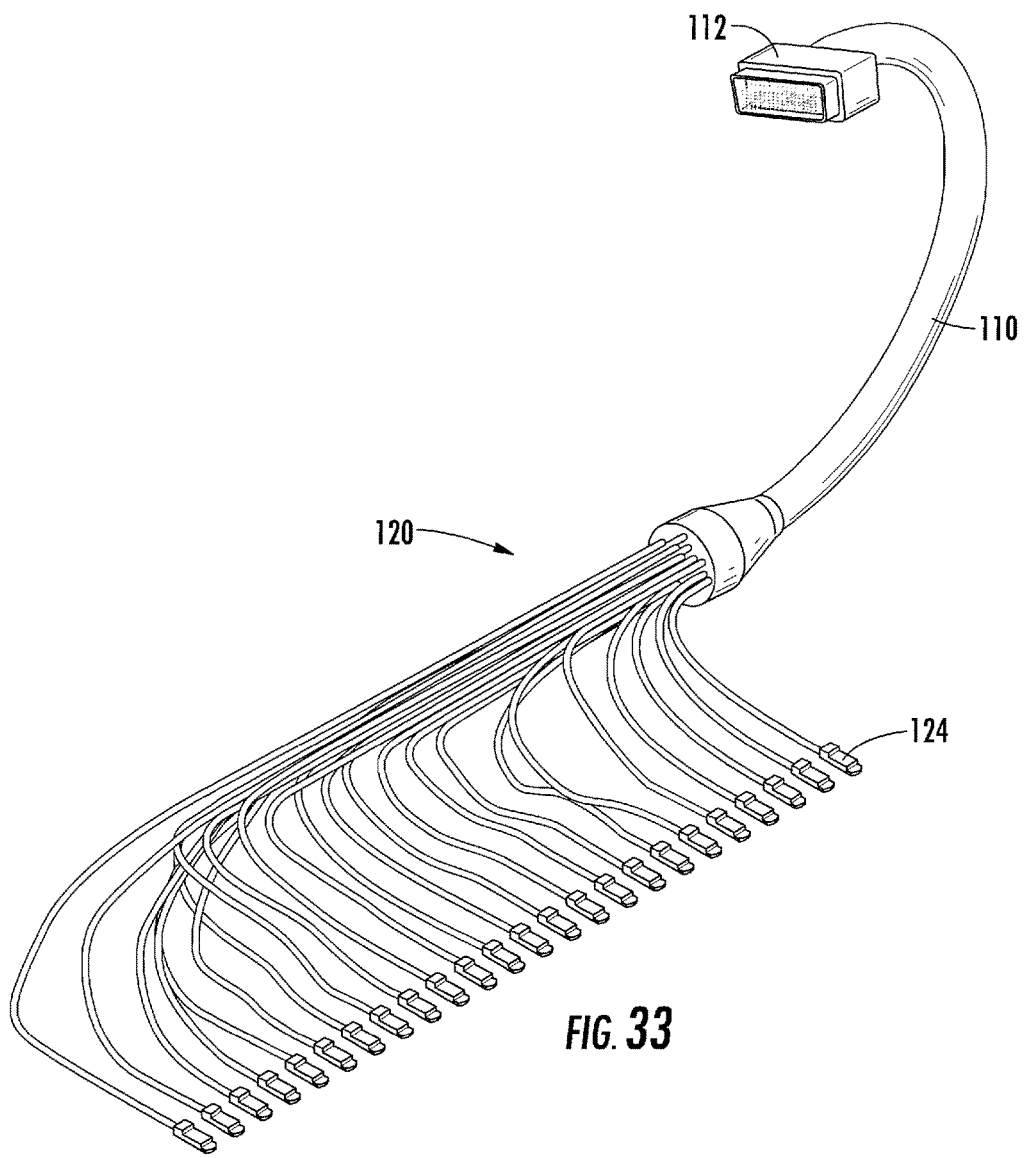
FIG. 33 is an alternate embodiment front perspective view of an HD split cable with standard UTP connectors.

In FIGS. 27, 28, and 33 different HD split cables are shown. The HD split cable (120) shown in FIG. 27, splits the copper wires from the HD cable head (112) into the 24 groupings of traditional UTP cords (124). There are 8 pin male connectors (124) on these ends which can be inserted into standard network RJ45 jacks. In this way, a network administrator can upgrade either to an HD patch panel or an HD switch, and be able to connect with a non-HD switch or non-HD patch panel, respectively. FIG. 33 shows the HD split cable (120) from FIG. 27 with an alternate configuration between the HD cable (110) and the HD cable head (112)

Figure 34:
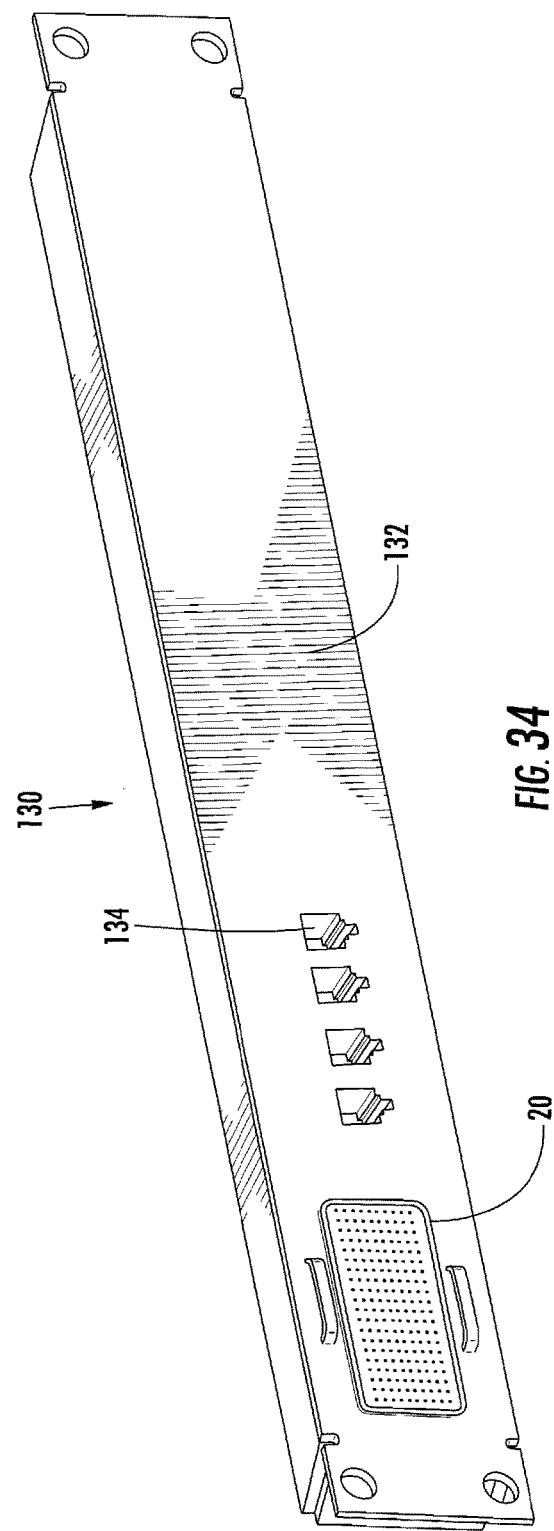
FIG. 34 is an alternate embodiment front perspective view of a 24 port HD patch panel equipped with (4) modular 2 pin jacks.
Figure 35:
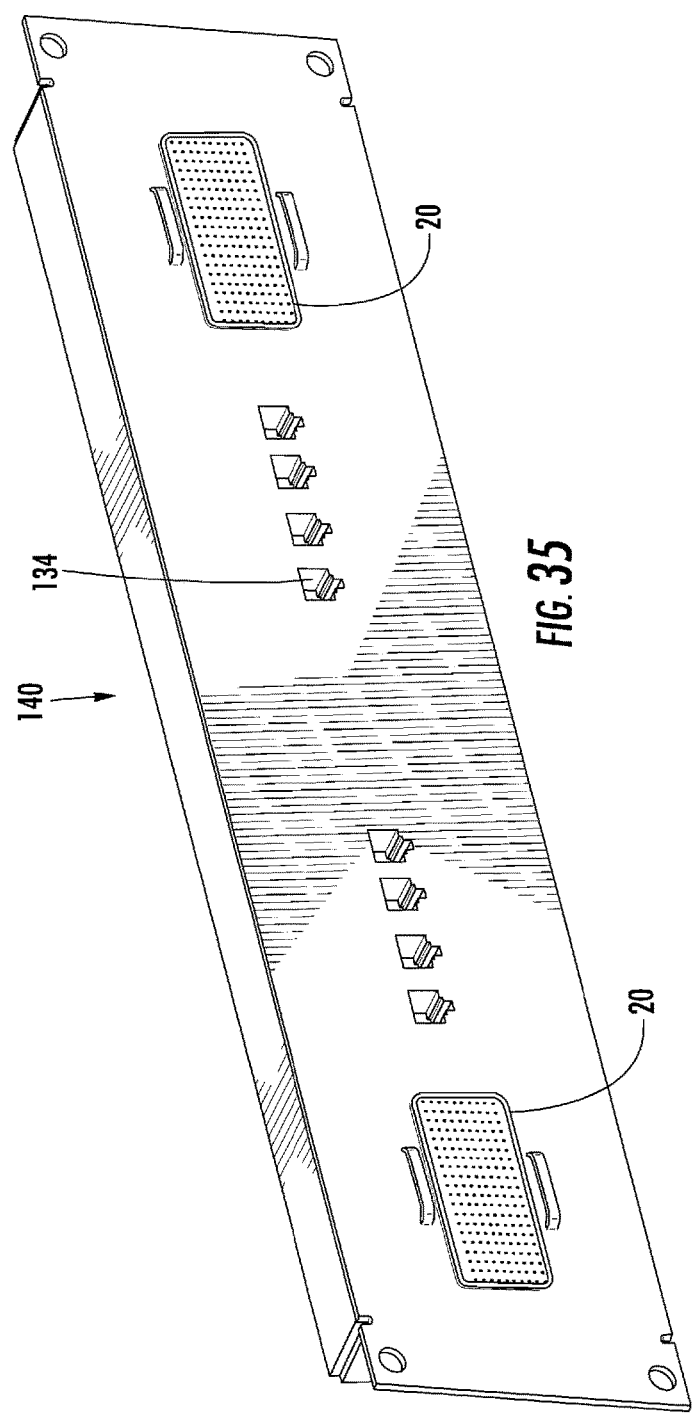
FIG. 35 is an alternate embodiment front perspective view of a 48 port HD patch panel equipped with (8) modular 2 pin jacks.
Figure 39:
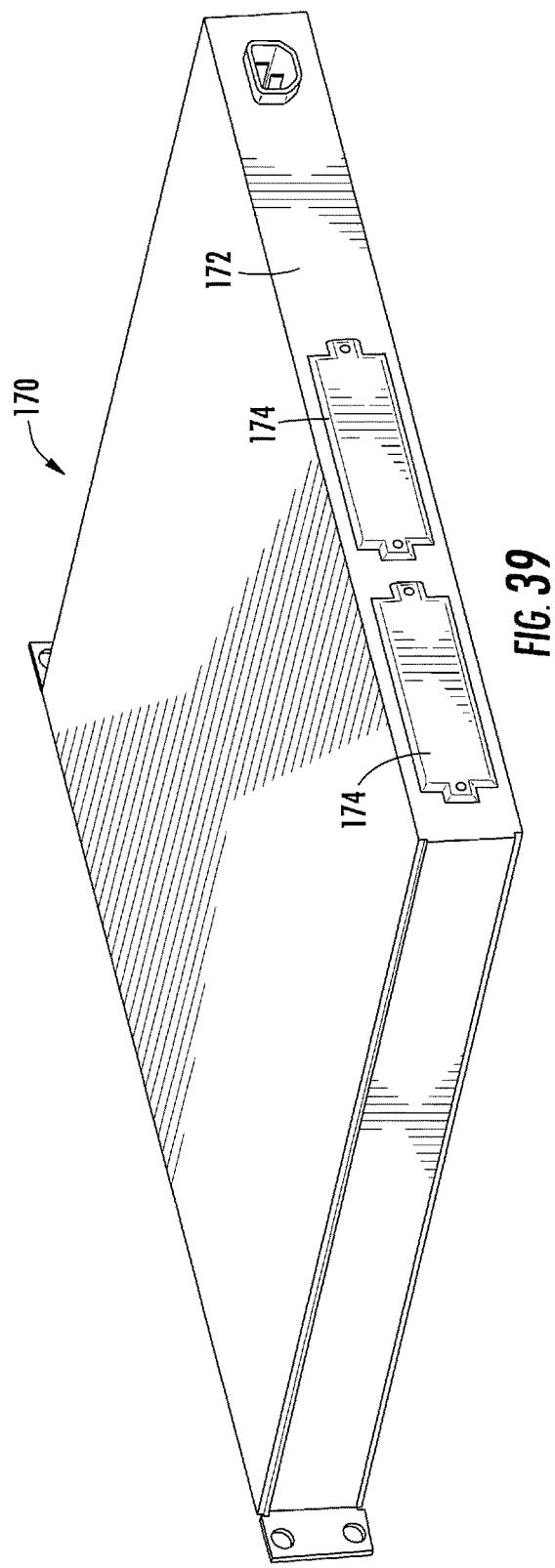
FIG. 39 is an alternate embodiment rear perspective view of a switch demonstrating FXO/FXS accessory cards occupying the optional accessory slots.

FIG. 34 shows an alternate 24-port patch panel (130) equipped with an HD jack (20) on the front face (132) along with 4 sets of 2 pin jacks (134). These 4 sets of 2 pin jacks are wired to the HD Jack (20) to the unused 8 conductors. These 4 sets of 2 pin jacks (134) on the front face (132) of the HD patch panel (130) allow an administrator to patch analog devices in and extend them across the network using an HD switch equipped with FXO/FXS cards as illustrated in FIG. 39. FIG. 35 shows an alternate 48-port patch panel (140) equipped with two HD jacks (20) on the front face (142) along with 8 sets of 2 pin jacks (134).

Figure 36:
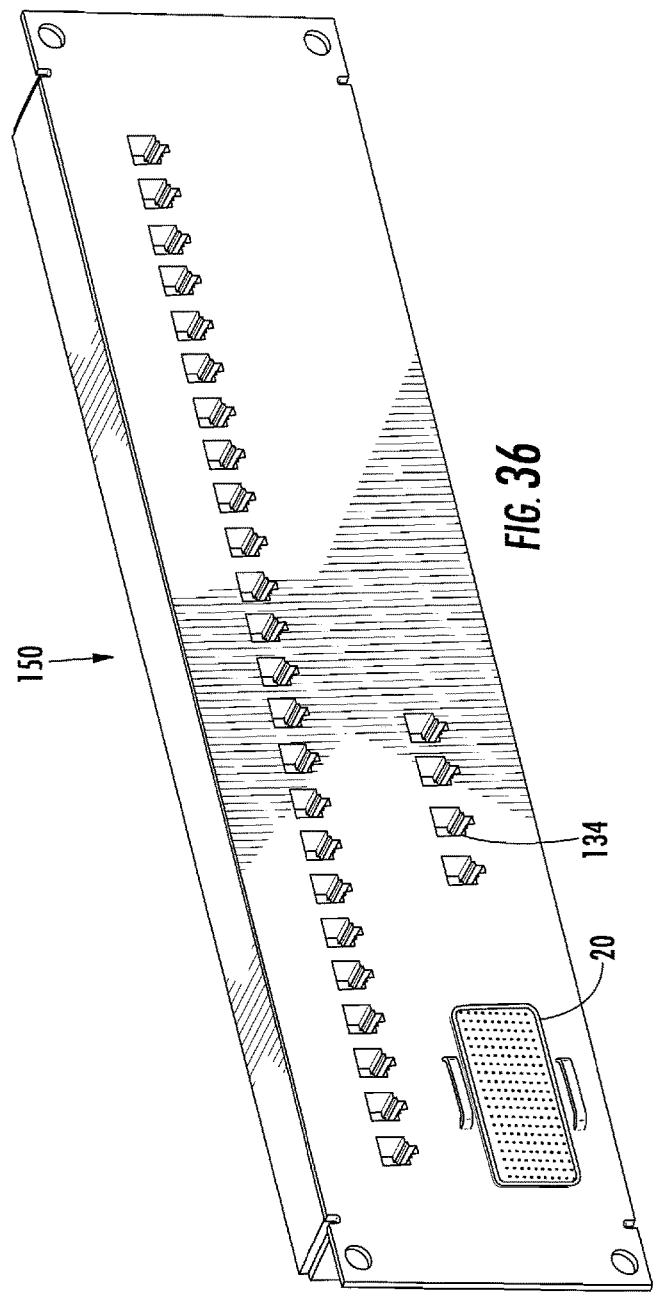
FIG. 36 is an alternate embodiment front perspective view of a 24 port patch panel with (4) modular 2 pin jacks.
Figure 37:
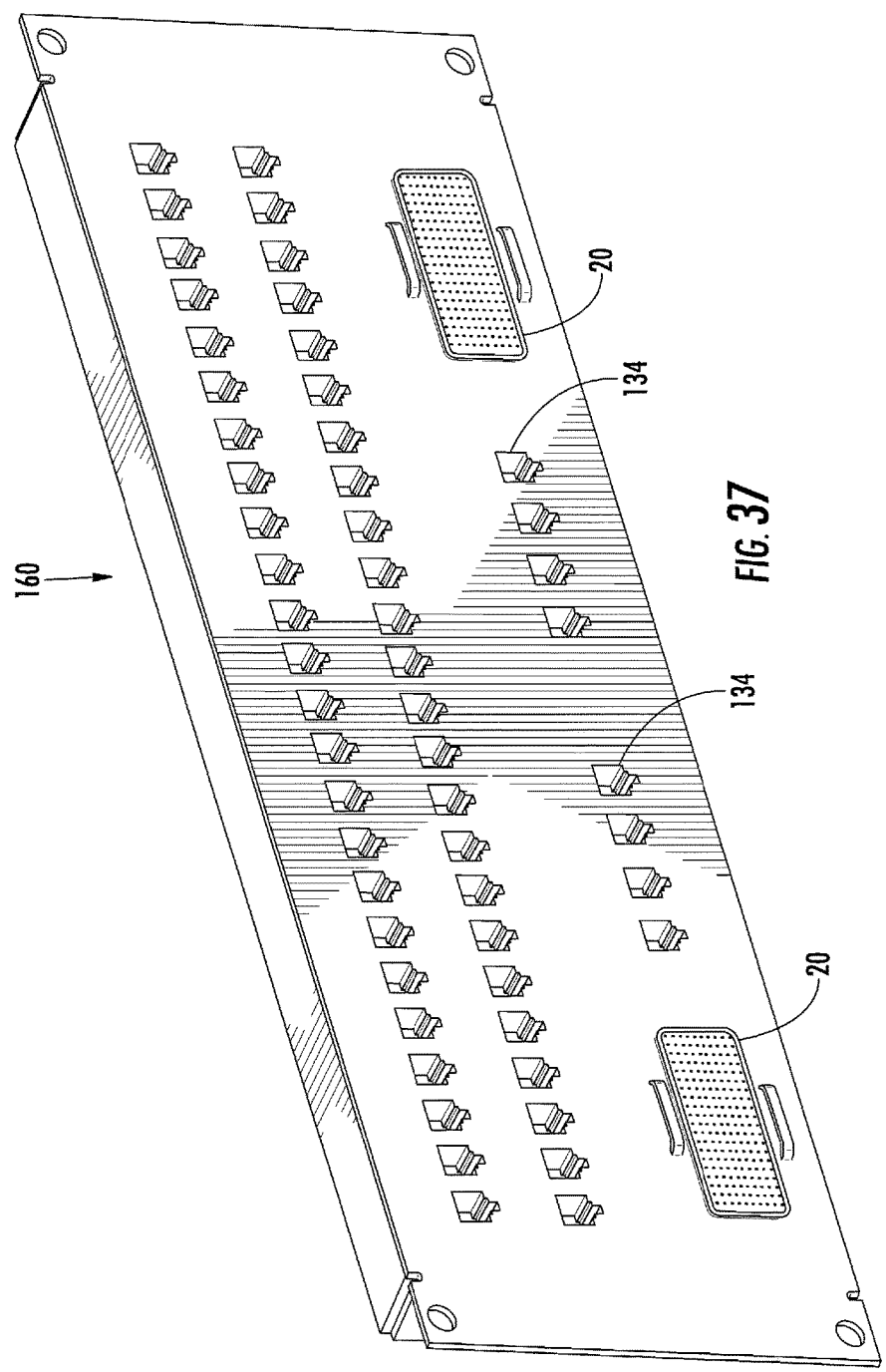
FIG. 37 is an alternate embodiment front perspective view of a 48 port patch panel with (8) modular 2 pin jacks.

FIG. 36 is an alternate 24-port HD port converter (150) that incorporates 4 sets of 2 pin jacks (134). FIG. 37 is an alternate 48-port HD port converter (160) that incorporates 8 sets of 2 pin jacks (134).

Figure 38:
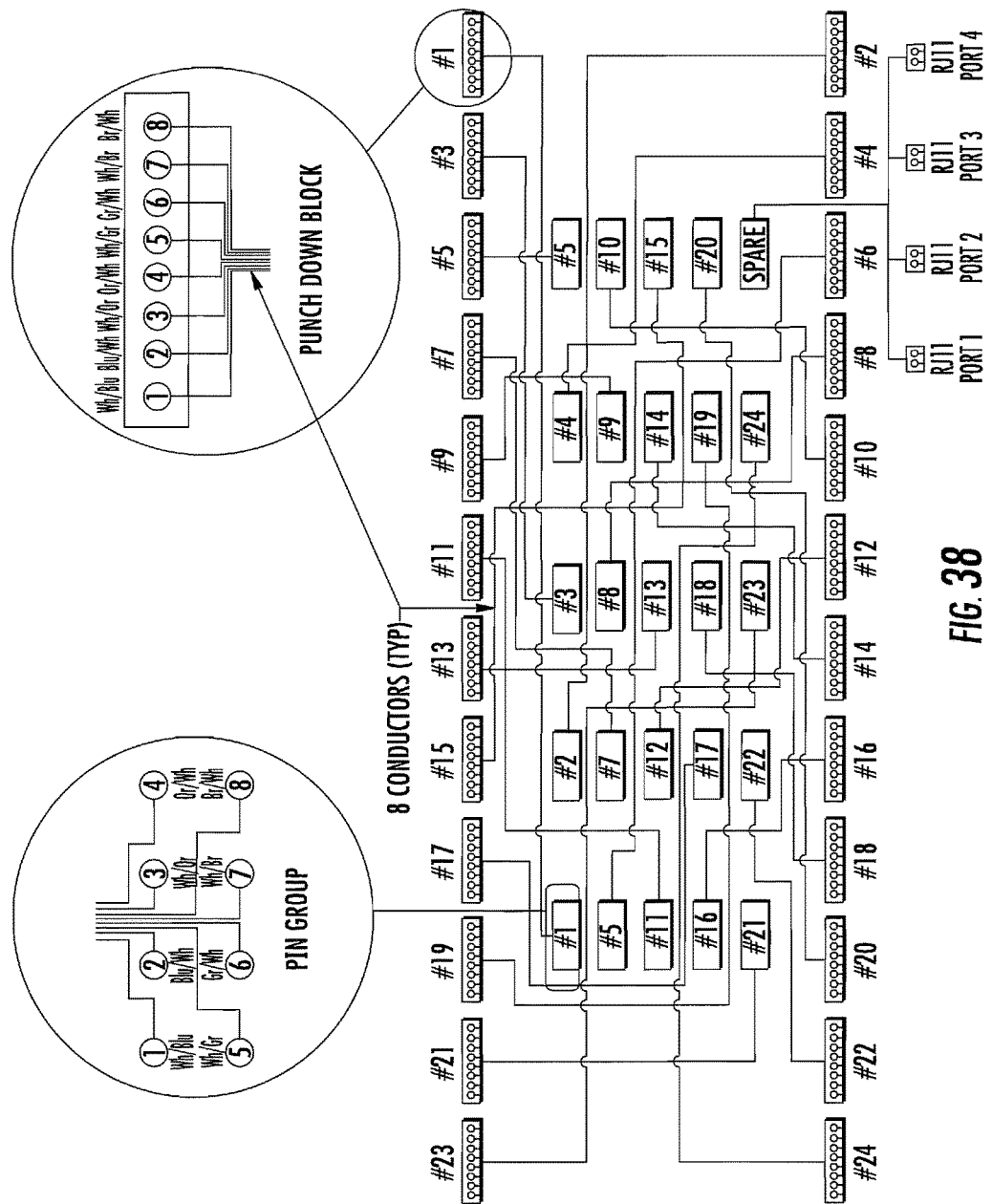
FIG. 38 is an alternate embodiment of a wiring schematic demonstrating the pin layout for an HD jack that encompasses (24) UTP cable connections and (4) sets of 2 pin connections.

FIG. 38 is a wiring schematic demonstrating how the 2 pin jacks (134) on the front face of FIG. 34-37 are wired directly to the HD jack (20).

FIG. 39 illustrates a switch (170) where the front face is equipped with an HD jack that is connected to a patch panel, as illustrated in FIG. 34-37, where 2 pin analog connections (134) get directly wired to the expansion slots (174) on the rear face (172) of the network switch. These expansion slots (174) in FIG. 39 are equipped with FXO/FXS cards that allow the network administrator to send/receive analog signals via the network without having to employee the use of an external FXO/FXS gateway or have additional wiring to contend with in the rack.

Figure 40:
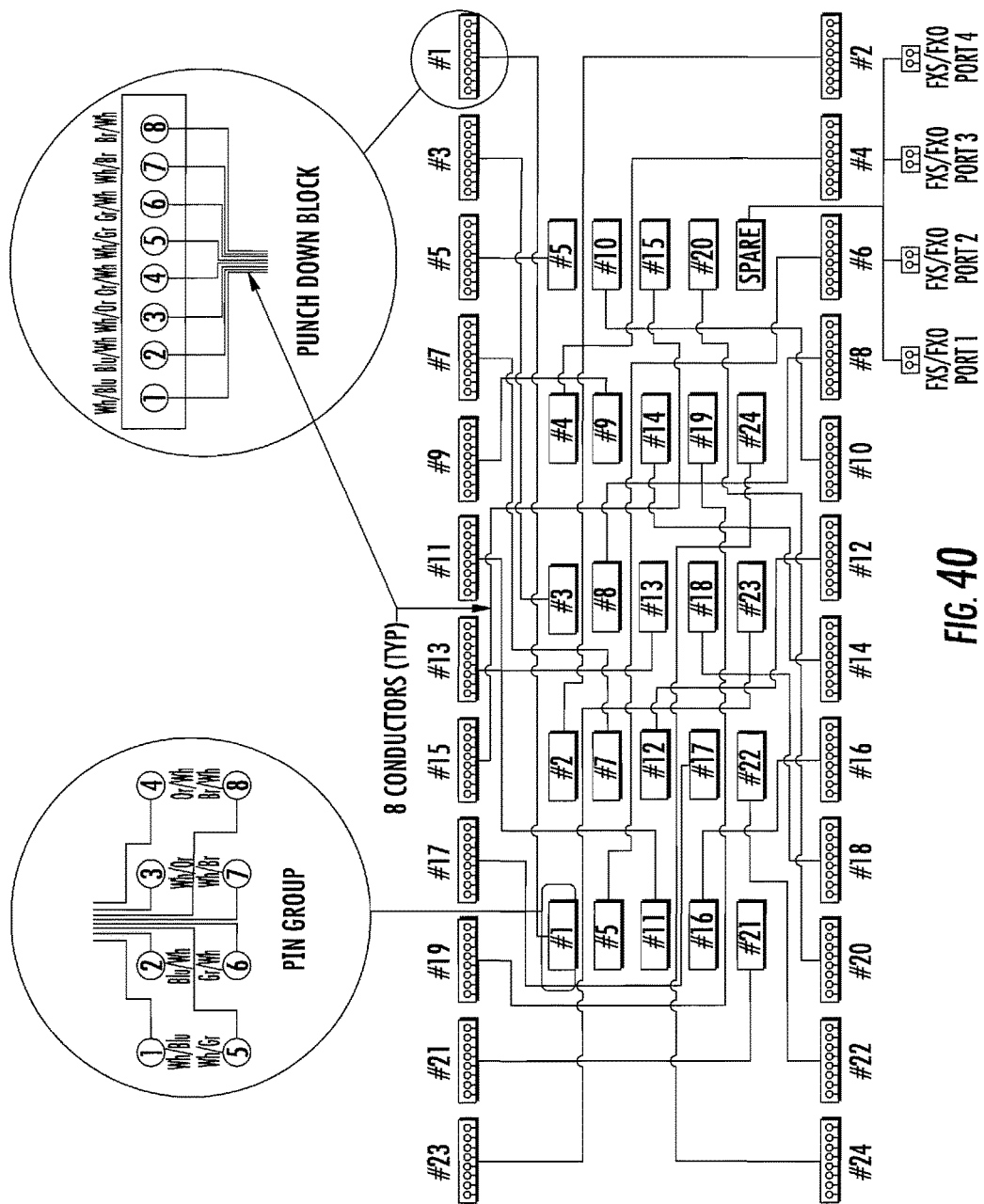
FIG. 40 is an alternate embodiment of a wiring schematic of an HD jack on a switch demonstrating (4) sets of 2 wire connections directly wired to the rear of the switch for interfacing with optional FXO/FXS accessory cards.
Figure 41:
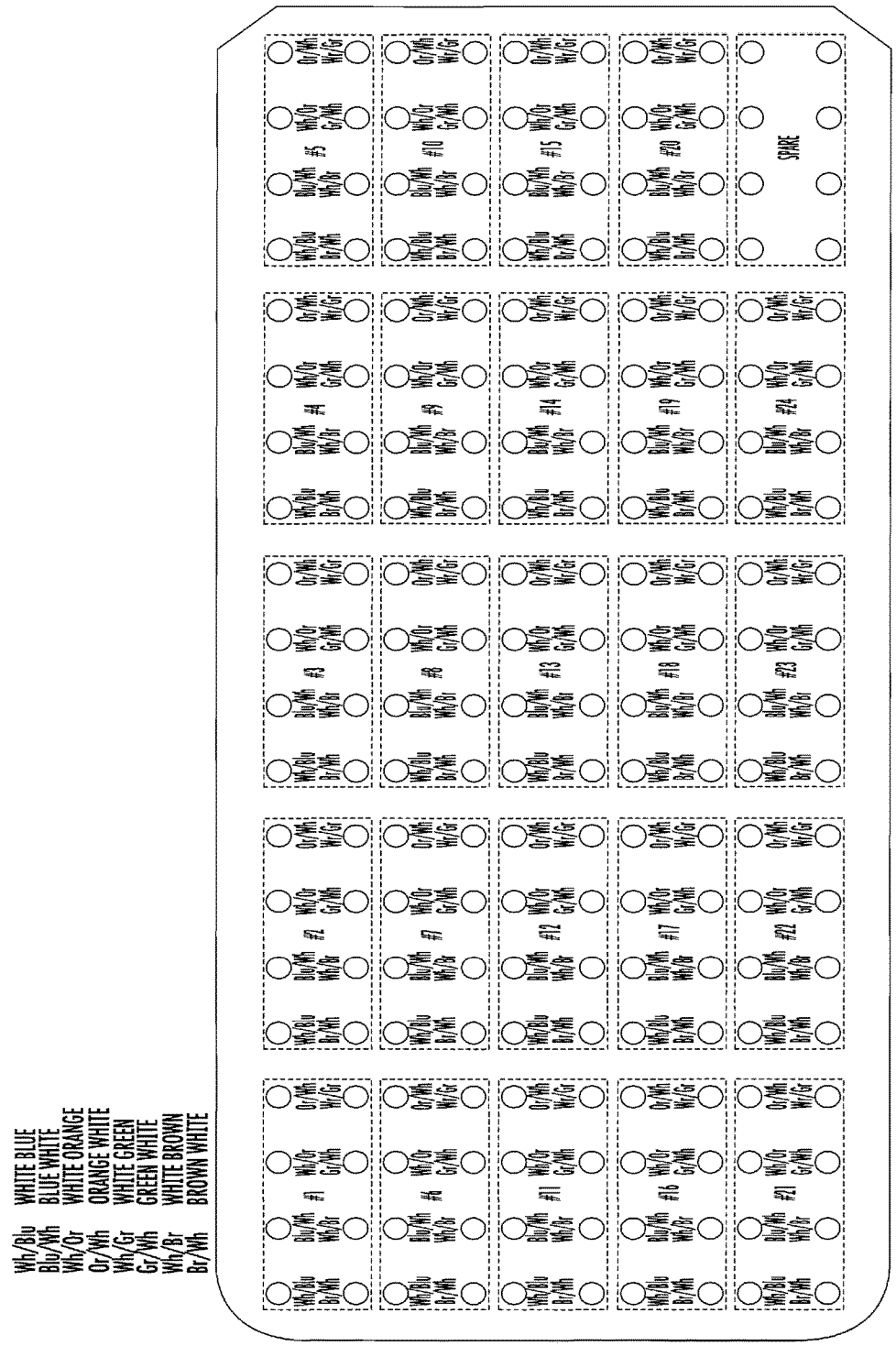
FIG. 41 is a 200 Jack Pin pinout illustration.
Figure 42:
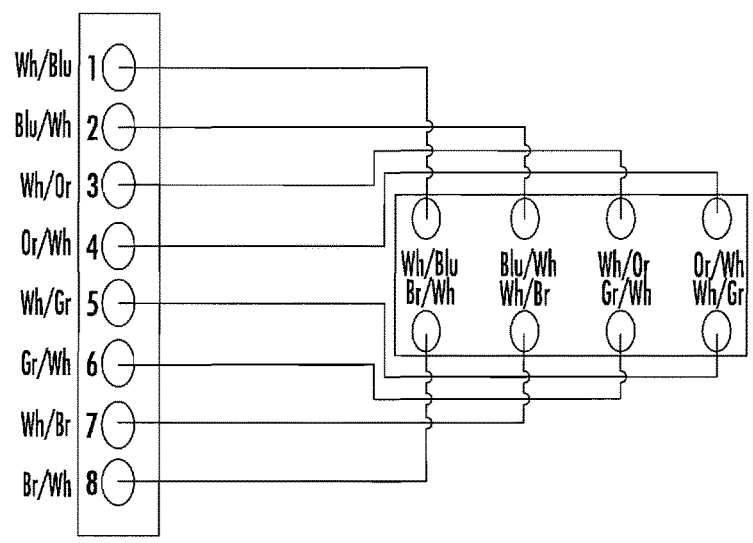
FIG. 42 is an 8 pin punch down block illustration.
Figure 43:
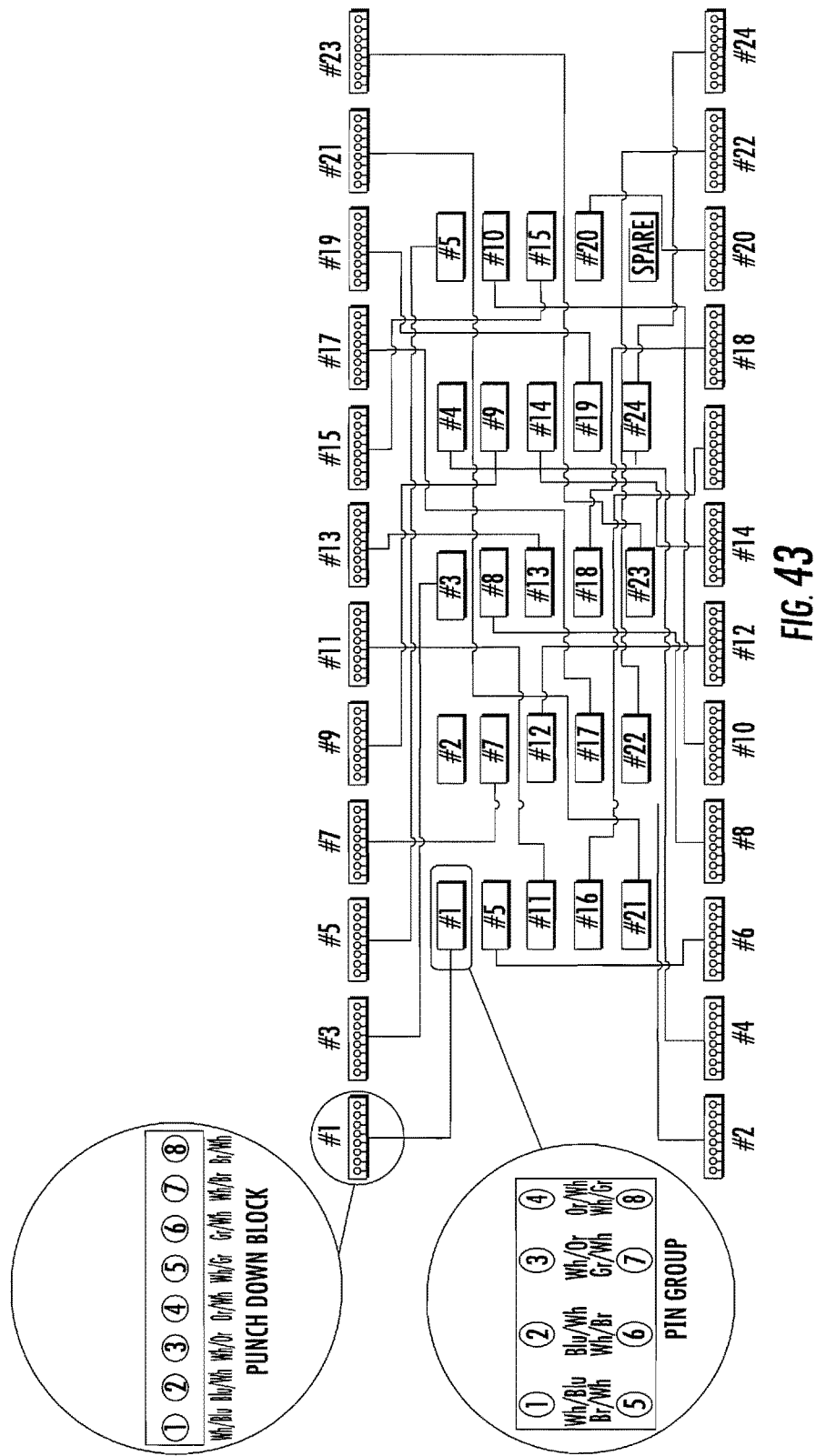
FIG. 43 is a 200 Jack Pin layout with an illustrated pin group and punch down block illustration.
Figure 44:
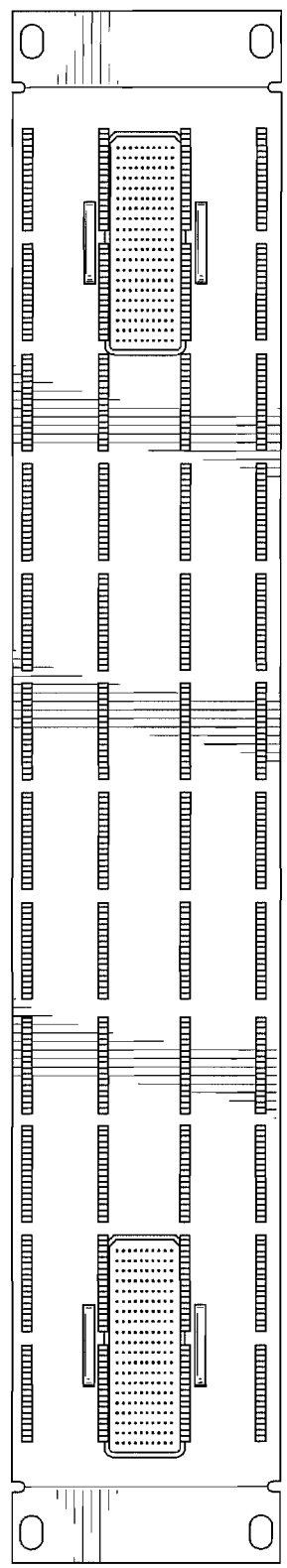
FIG. 44 is a vertical patch panel illustration.
Figure 45:
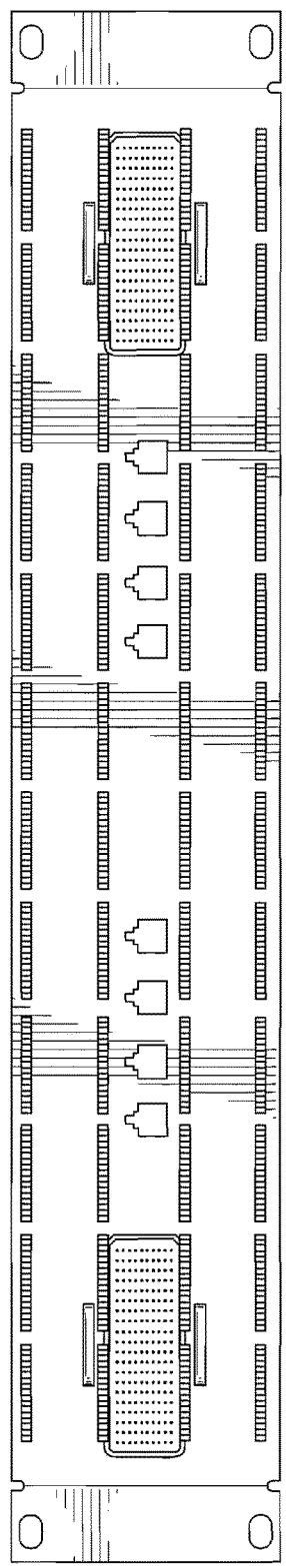
FIG. 45 is a patch panel 48 with RJ11 plugs illustration.
Figure 46:
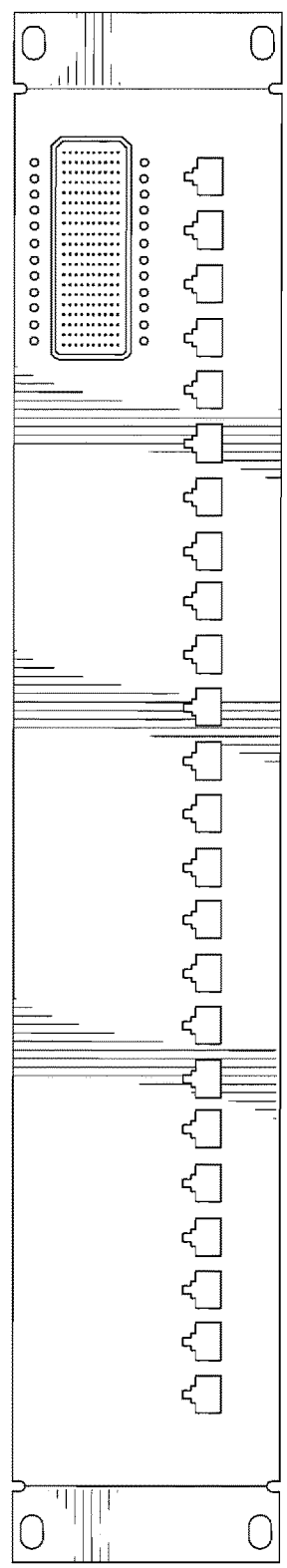
FIG. 46 is a patch panel 24 port convertor and 192 pins illustration.
Figure 47:
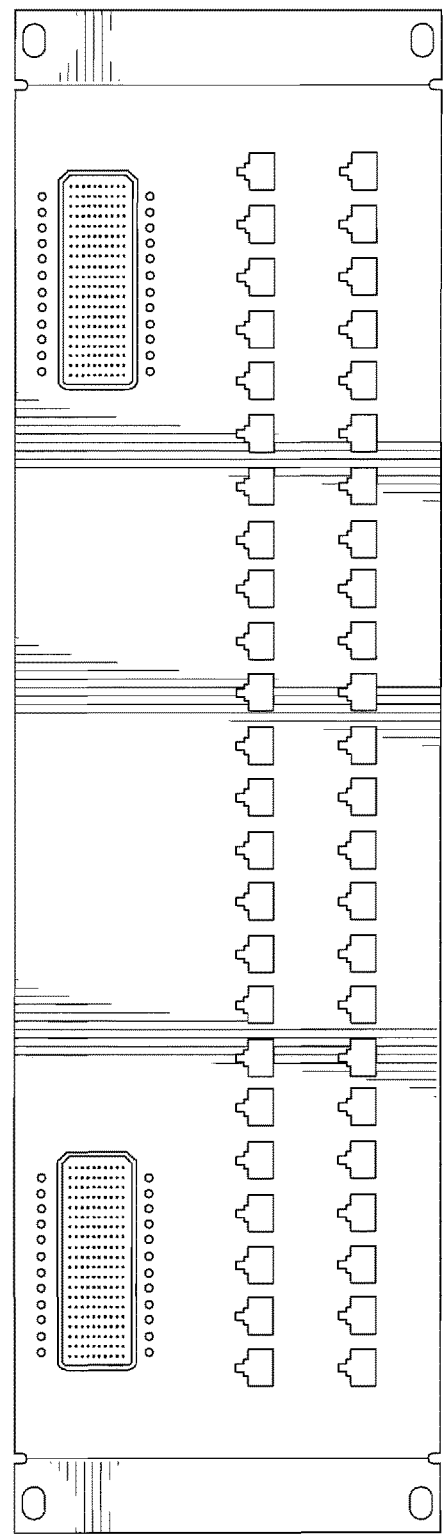
FIG. 47 is a patch panel illustration with 48 port convertor illustration.
Figure 48:
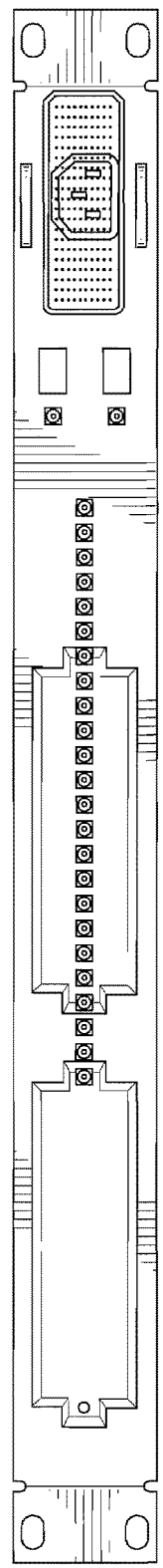
FIG. 48 is a switch illustration with 24 ports.
Figure 49:
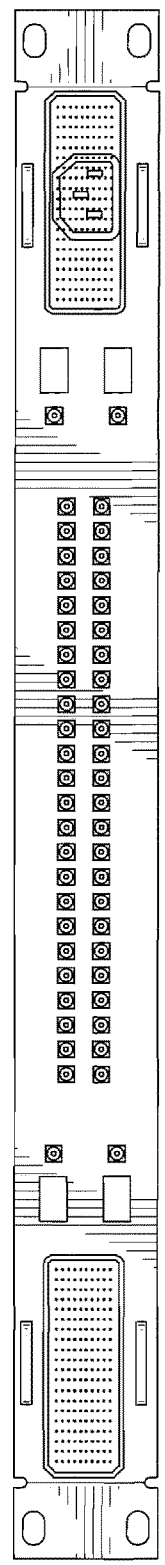
FIG. 49 is a switch illustration with 48 ports.
Figure 50:
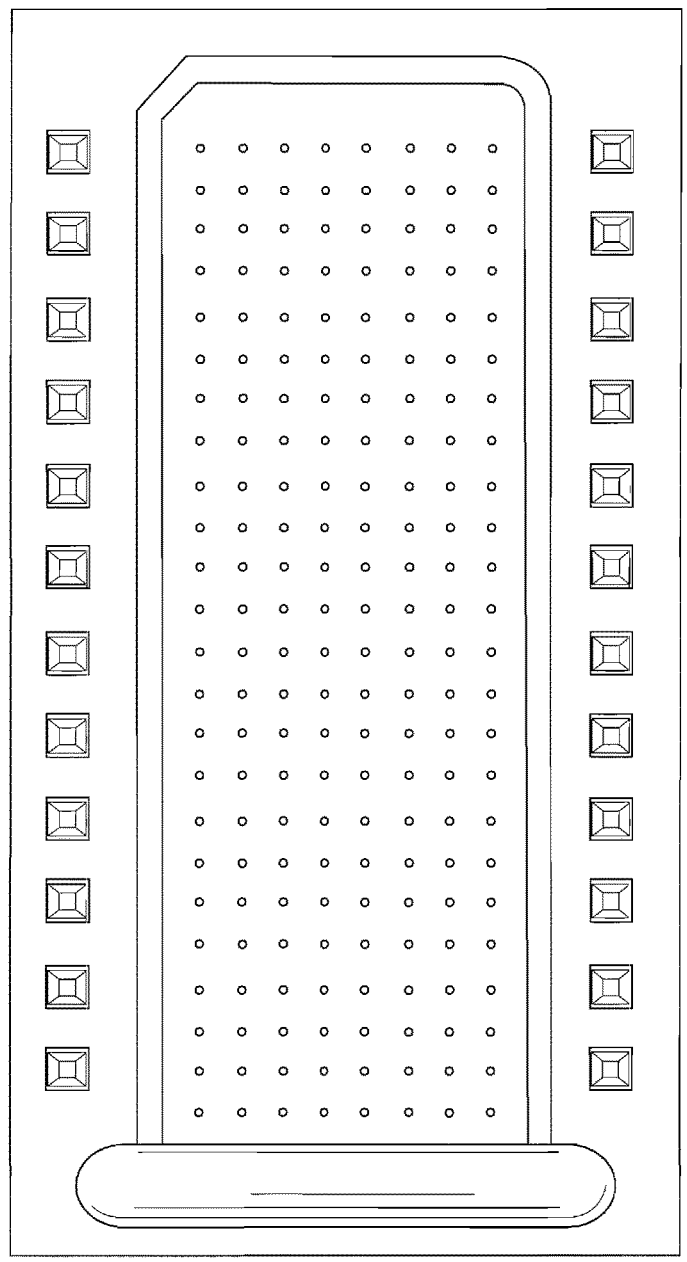
FIG. 50 is a jack modular illustration.
Figure 51:
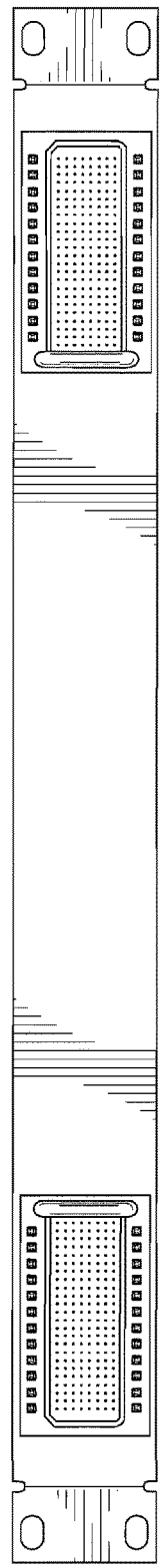
FIG. 51 is a high density switch illustration with 2 Jacks.
Figure 52:
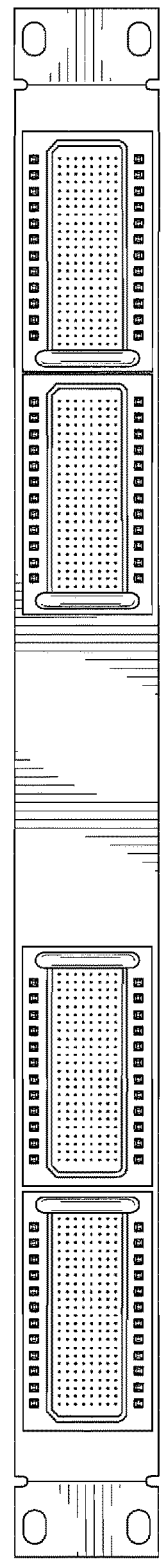
FIG. 52 is a high density switch illustration with 4 Jacks.
Figure 53:
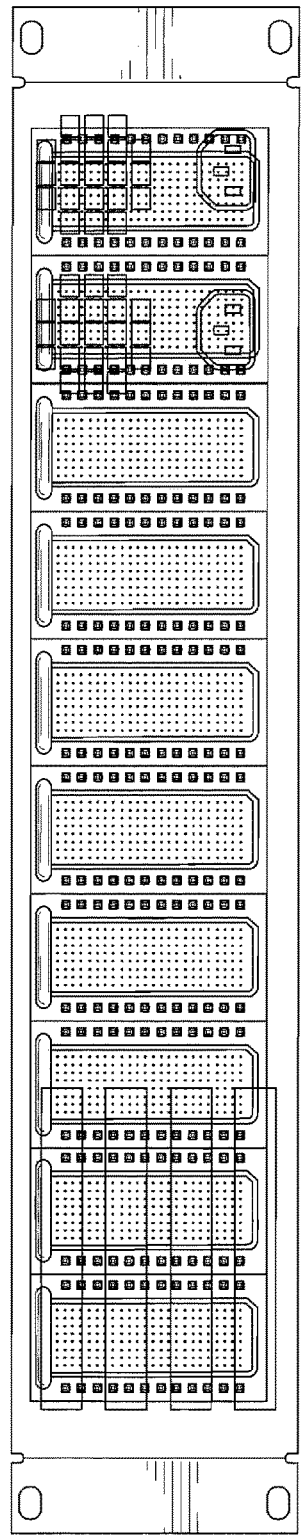
FIG. 53 is a high density switch illustration with 10 Jacks.
Figure 54:
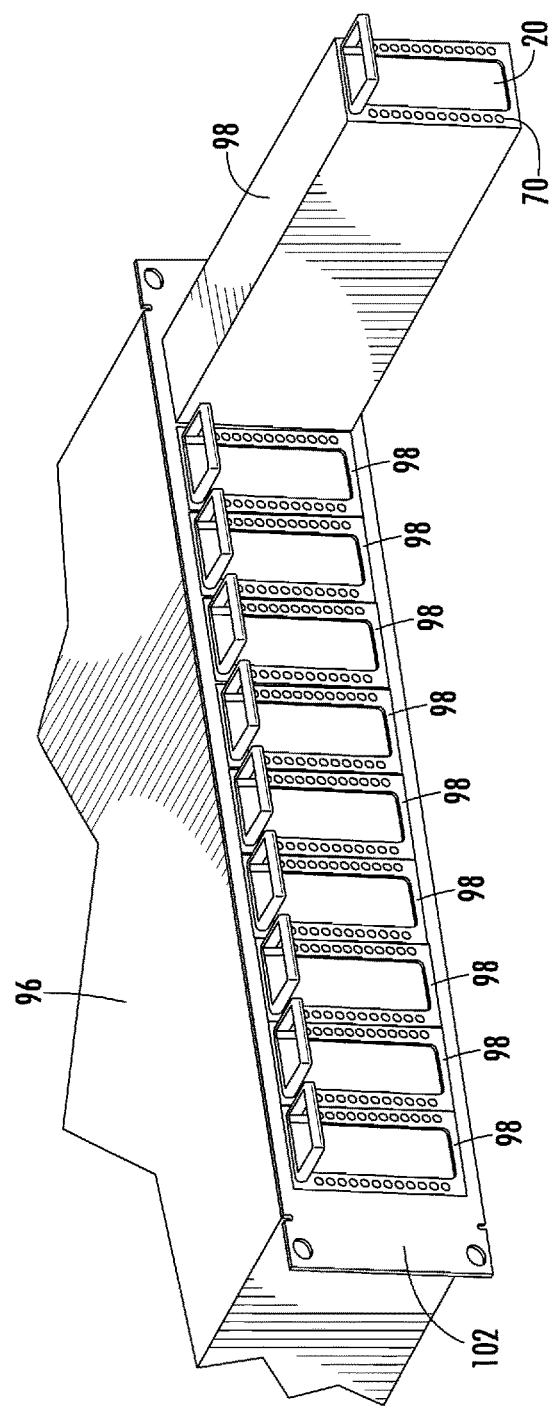
FIG. 54 is a high density switch illustration with 10 slots for use with 10 removable switch blades.
Figure 55:
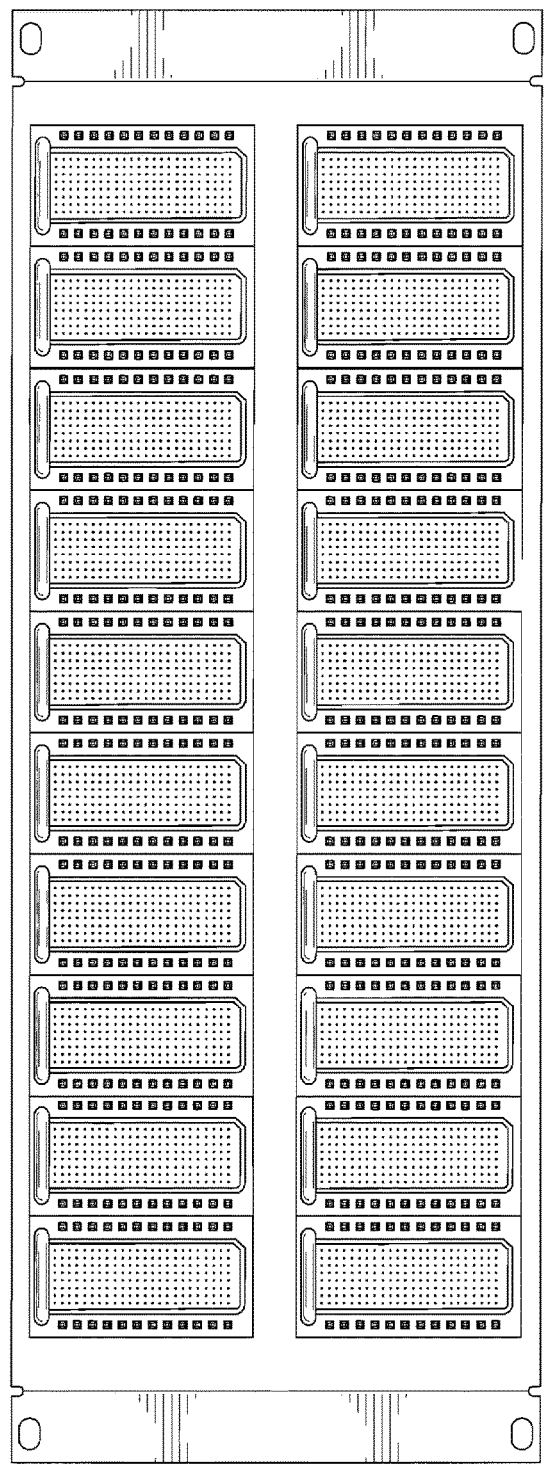
FIG. 55 is a high density switch illustration with 20 slots for use with 20 removable switch blades.
Figure 56:
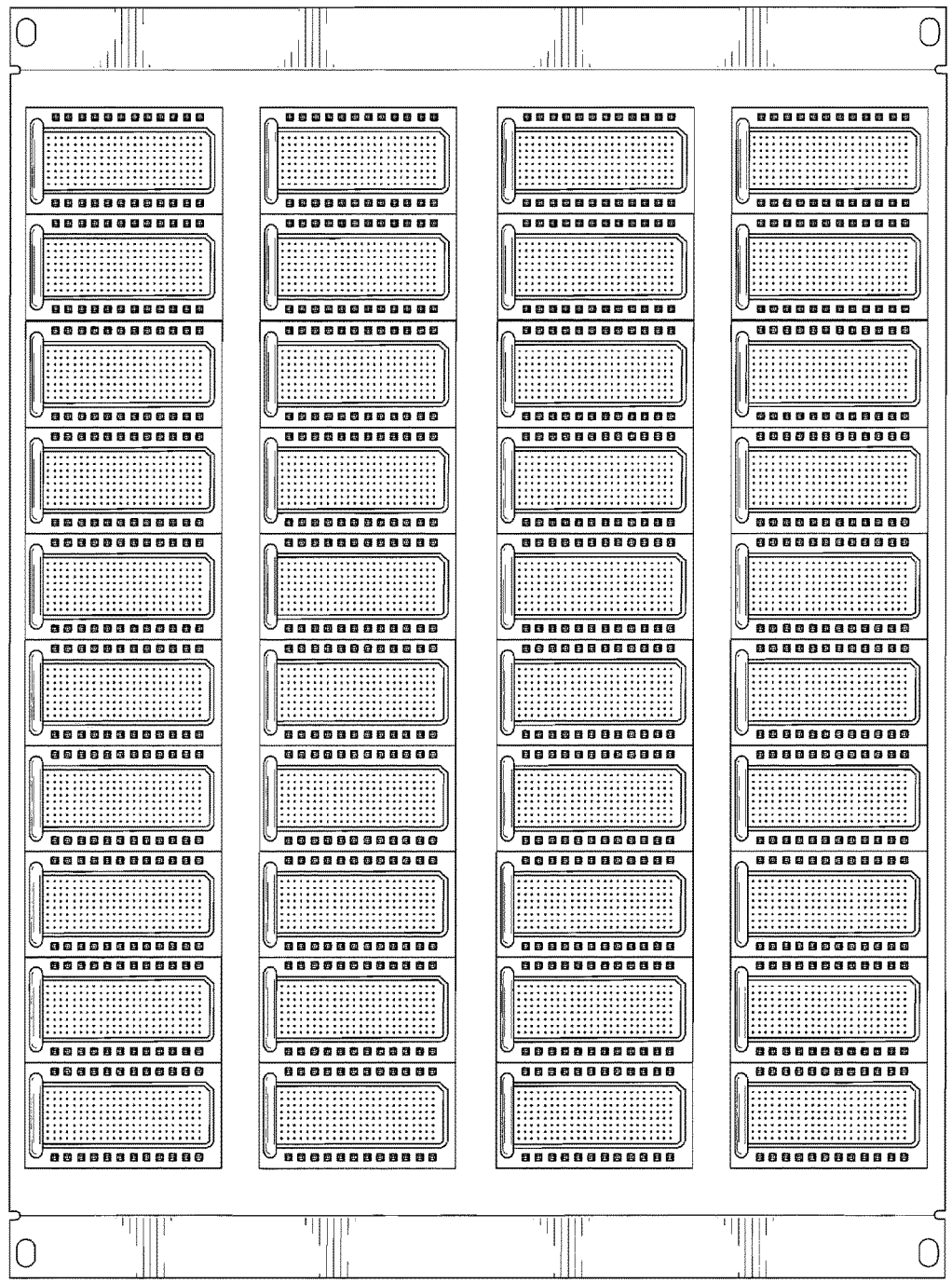
FIG. 56 is a high density switch illustration with 40 slots for use with 40 removable switch blades.
Figure 57:
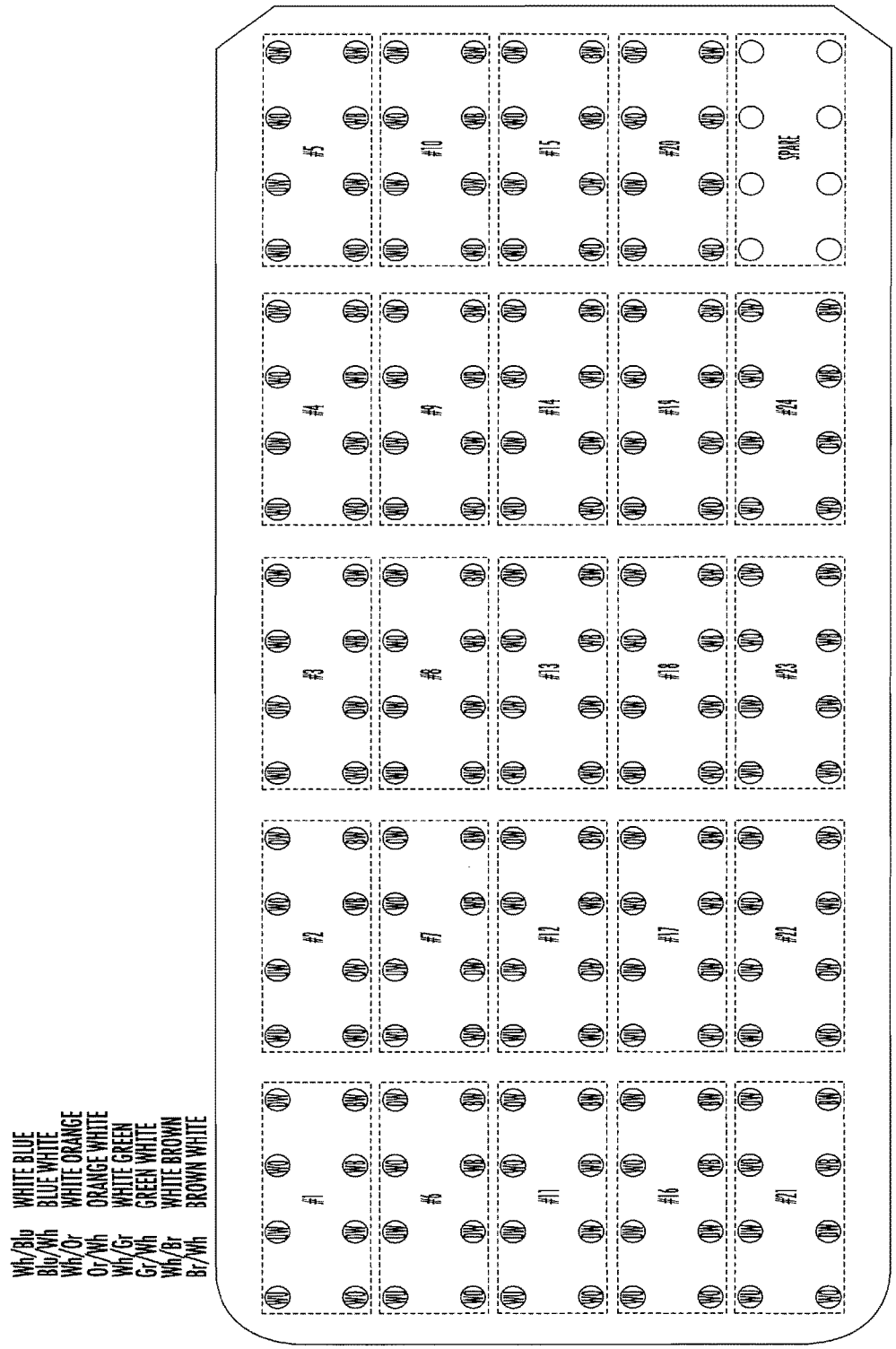
FIG. 57 is a high density patch panel color pin illustration with 200 pins.
Figure 58:
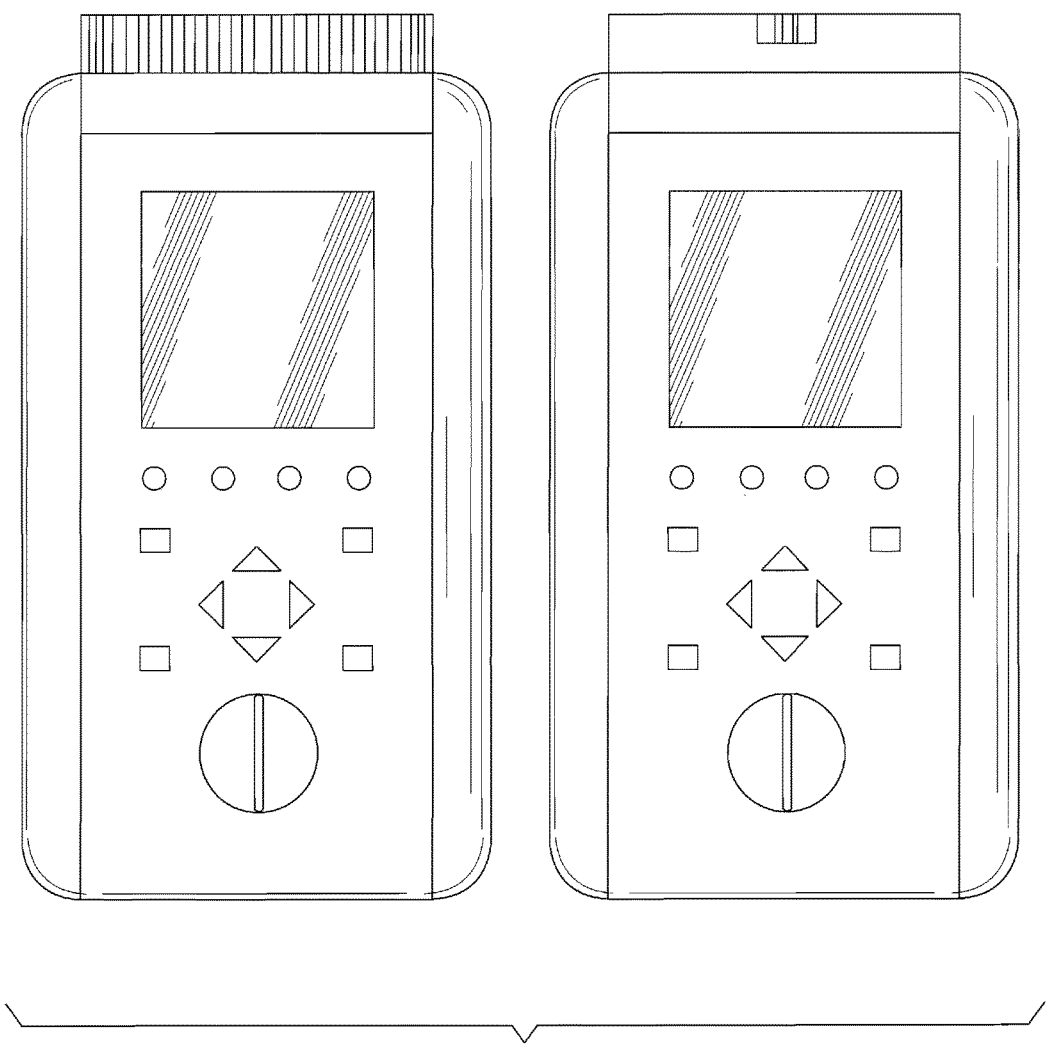
FIG. 58 is an illustration of a switching/routing software for use in a virtual environment with high density switching blades.
Figure 59:
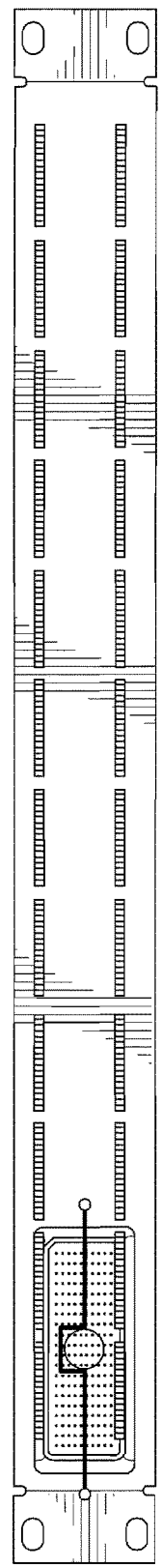
FIG. 59 is an illustration of a high density jack with a spring a securing bracket.
Figure 60:
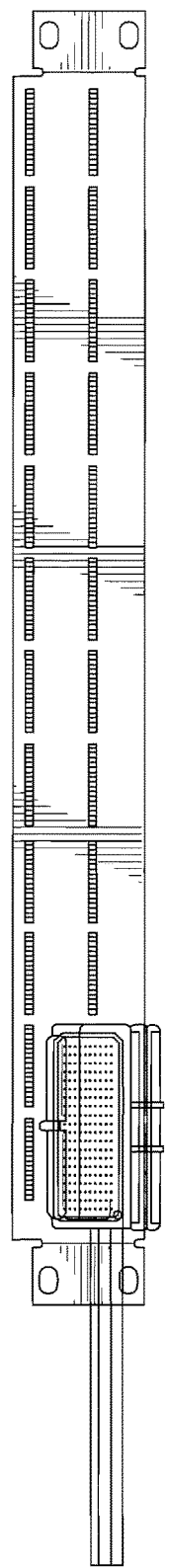
FIG. 60 is an illustration of a high density jack with spring loaded clamps.
Figure 61:
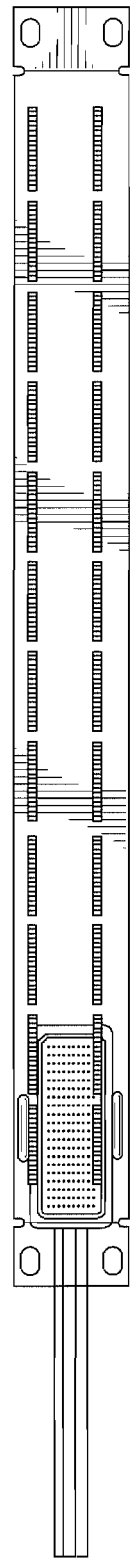
FIG. 61 is an illustration of a high density jack with Velcro strap attachment.

FIG. 40 illustrates the reverse of FIG. 38 demonstrating how the sets of 2 pin connections (134) noted above are connected to the expansion slots on the back of the switch.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A high density (HD) data communications patch panel comprising:
   a patch panel frame having a front face and a rear face, said front face having a first 192 pin connection port and a second 192 pin connection port; said rear face having a first cable connection group electrically coupled to said first 192 pin connection port and a second cable connection group electrically coupled to said second 192 pin connection port; said first cable connection group comprising a first row of 12 insulation-displacement connectors (IDC's) equally spaced across a width along an upper edge of said rear face and a second row of 12 IDC's equally spaced across the width of said rear face between said first row and a lower edge; said second cable connection group comprising a third row of 12 IDC's equally spaced across the width of said rear face between said second row and said lower edge and a fourth row of 12 IDC's equally spaced across the width of said rear face along said lower edge.

2. The data communications patch panel according to claim 1 wherein said frame includes brackets secured to each end of said patch panel for mounting to a network rack.

3. A high density (HD) data communications patch panel comprising:
   a patch panel frame having a front face and a rear face, said front face having a first 200 pin connection port and a second 200 pin connection port; said rear face having a first cable connection group electrically coupled to said first 200 pin connection port and a second cable connection group electrically coupled to said second 200 pin connection port; said first cable connection group comprising a first row of 12 insulation-displacement connectors (IDC's) equally spaced across a width along an upper edge of said rear face and a second row of 12 IDC's equally spaced across the width of said rear face between said first row and a lower edge; said second cable connection group comprising a third row of 12 IDC's equally spaced across the width of said rear face between said second row and said lower edge and a fourth row of 12 IDC's equally spaced across the width of said rear face along said lower edge.

4. The data communications patch panel according to claim 3 wherein said frame includes brackets secured to each end of said patch panel for mounting to a network rack.

* * * * *